US012369729B2

(12) United States Patent
Gulick, Jr. et al.

(10) Patent No.: US 12,369,729 B2
(45) Date of Patent: Jul. 29, 2025

(54) SECURITY BARRIER APPARATUS AND SYSTEM

(71) Applicant: Scorpion Security Products, Inc., Vestal, NY (US)

(72) Inventors: Franklyn W. Gulick, Jr., Binghamton, NY (US); Gary R. Page, Chenango Forks, NY (US); Patrick McEwen, Greene, NY (US); Andy Bartoszewski, Syracuse, NY (US)

(73) Assignee: Scorpion Security Products, Inc., Vestal, NY (US)

( * ) Notice: Subject to any disclaimer, the term of this patent is extended or adjusted under 35 U.S.C. 154(b) by 321 days.

(21) Appl. No.: 18/128,530

(22) Filed: Mar. 30, 2023

(65) Prior Publication Data

US 2023/0309714 A1 Oct. 5, 2023

Related U.S. Application Data

(60) Provisional application No. 63/425,531, filed on Nov. 15, 2022, provisional application No. 63/325,434, filed on Mar. 30, 2022.

(51) Int. Cl.
*A47F 3/00* (2006.01)
*E05F 15/611* (2015.01)

(52) U.S. Cl.
CPC ............ *A47F 3/002* (2013.01); *E05F 15/611* (2015.01); *E05Y 2400/85* (2013.01); *E05Y 2900/202* (2013.01)

(58) Field of Classification Search
CPC .. A47F 3/00; A47F 3/002; A47F 3/004; E05F 15/60; E05F 15/603; E05F 15/605; E05F 15/608; E05F 15/611; E05Y 2400/85; E05Y 2900/20; E05Y 2900/202; E05Y 2900/204; E05Y 2900/208
USPC ........................................................... 70/277
See application file for complete search history.

(56) References Cited

U.S. PATENT DOCUMENTS

| | | | | |
|---|---|---|---|---|
| 2,552,094 | A * | 5/1951 | Hamon | B25B 1/2426 269/156 |
| 5,848,562 | A * | 12/1998 | Somma | B23B 29/043 82/158 |
| 9,039,785 | B2 * | 5/2015 | Gulick, Jr. | G08B 13/149 726/35 |
| 10,920,922 | B2 * | 2/2021 | Chapuis | F16M 13/02 |
| 11,015,626 | B2 * | 5/2021 | Leyden | E05B 73/0082 |

(Continued)

*Primary Examiner* — Nathan Cumar
(74) *Attorney, Agent, or Firm* — Barclay Damon LLP

(57) ABSTRACT

A security barrier apparatus includes an attachment portion structured to couple the security barrier apparatus to a display fixture, a support portion that couples to the attachment portion and a barrier portion pivotally coupled to the support portion. An input device coupled to the support portion, a control module coupled to one of the support portion and the attachment portion, and a locking assembly is in communication with the input device. The control module is structured to be in electrical communication with the input device and the locking assembly to signal the locking assembly to move to the unlocked state when an input is provided to the input device and further structured to signal the locking assembly to move to the locked state when the input ceases to be provided to the input device. When unlocked, the barrier portion is enabled to pivot between an open and closed position.

20 Claims, 23 Drawing Sheets

(56) References Cited

U.S. PATENT DOCUMENTS

| | | | | |
|---|---|---|---|---|
| 2006/0187033 | A1* | 8/2006 | Hall | B65D 7/00 340/539.22 |
| 2006/0288643 | A1* | 12/2006 | Henshell | E01F 13/06 49/49 |
| 2011/0088086 | A1* | 4/2011 | Swink | G06F 3/0488 715/764 |
| 2013/0318639 | A1* | 11/2013 | Gulick, Jr. | G08B 13/1445 726/35 |
| 2017/0049251 | A1* | 2/2017 | Gulick, Jr. | F16M 13/00 |
| 2019/0316386 | A1* | 10/2019 | Gulick, Jr. | E05B 73/0082 |
| 2021/0123268 | A1* | 4/2021 | Gulick Jr. | E05B 73/00 |
| 2021/0238892 | A1* | 8/2021 | Gulick, Jr. | G08B 13/149 |
| 2021/0330075 | A1* | 10/2021 | Gulick | A47B 23/042 |
| 2021/0363788 | A1* | 11/2021 | Gulick, Jr. | F16M 13/02 |
| 2021/0375110 | A1* | 12/2021 | Gulick, Jr. | G08B 13/2434 |

* cited by examiner

FIG. 11E

| ID | Name | Designator | Footprint | Quantity | Manufacturer Part | Manufacturer |
|---|---|---|---|---|---|---|
| 1 | CR2032-BS-2-1 | B1 | BAT-TH_BS-2-1 | 1 | BS-2-1 | Q&J |
| 2 | 100uF | C1 | CAP-SMD_L6.0-W3.2-R-RD | 1 | TAJC107M016RNJ | AVX |
| 3 | 470uF | C2 | CAP-SMD_L7.3-W4.3-R-RD | 1 | T491D477K006AT | KEMET |
| 4 | 10uF | C3 | C0603 | 1 | CL10A106MP8NNNC | SAMSUNG |
| 5 | 100nF | C4 | C0402 | 1 | CC0402KRX7R7BB104 | YAGEO |
| 6 | XH-4A | CN1 | CONN-TH_4P-P2.50_XH-4A | 1 | XH-4A | BOOMELE |
| 7 | 1N5819W | D1 | SOD-123F_L2.7-W1.7-LS3.7-RD-1 | 1 | 1N5819W | YFW佑风微 |
| 8 | 220uH | L1 | IND-SMD_L8.0-W8.0 | 1 | YNR8040-221M | YJYCOIN |
| 9 | WJ126V-5.0-6P | P2 | CONN-TH_6P-P5.00_WJ126V-5.0-6P | 1 | WJ126V-5.0-6P | ReliaPro |
| 10 | TS-1187A-B-A-B | PROG,RESET | SW-SMD_4P-L5.1-W5.1-P3.70-LS6.5-TL-2 | 2 | TS-1187A-B-A-B | XKB Enterprise |
| 11 | PMBT3904 | Q1,Q4,Q5 | SOT-23_L2.9-W1.3-P1.90-LS2.4-BR | 3 | PMBT3904,215 | Nexperia |
| 12 | MMBT5551 | Q2,Q3 | SOT-23-3_L2.9-W1.3-P1.90-LS2.4-BR | 2 | MMBT5551 | CJ |
| 13 | 0.33Ω | R1 | R1206 | 1 | CR1206F0R33P05 | Ever Ohms Tech |
| 14 | 1.5K | R2,R4 | R0402 | 2 | RC0402FR-071K5L | YAGEO |
| 15 | 1kΩ | R3,R8,R9 | R0402 | 3 | RC-02W1001FT | Guangdong Fenghua Advanced Tech |
| 16 | 470 | R5,R6,R7 | R0402 | 3 | AC0402FR-07470RL | YAGEO |
| 17 | 4.7kΩ | R10,R11,R12 | R0402 | 3 | 0402WGJ0472TCE | UniOhm |
| 18 | ESP32-WROOM-32UE(4MB) | U1 | WIFI-SMD_ESP32-WROOM-32UE | 1 | ESP32-WROOM-32UE(4MB) | Espressif Systems |
| 19 | HT7550S | U2 | SOT-23-3_L2.9-W1.5-P1.90-LS2.8-BR-CW | 1 | HT7550S | UMW(Youtai Semiconductor Co., Ltd.) |
| 20 | DS1307Z+T&R | U3 | SOIC-8_L5.0-W4.0-P1.27-LS6.0-BL | 1 | DS1307Z+T&R | MAXIM |
| 21 | AZ34063UMTR-G1 | U5 | SOIC-8_L4.9-W3.9-P1.27-LS6.0-BL | 1 | AZ34063UMTR-G1 | DIODES |
| 22 | 32.768kHz | X1 | OSC-TH_BD3.1-P0.8-D0.3 | 1 | X308032768KGB2SC | YXC |

400

SECURITY BARRIER APPARATUS AND SYSTEM

CROSS-REFERENCE TO RELATED APPLICATIONS

This application claims the benefit and priority of commonly owned U.S. Provisional Application Ser. No. 63/325,434, filed Mar. 30, 2022, and U.S. Provisional Application Ser. No. 63/425,531, filed on Nov. 15, 2022. The entire contents of said applications are hereby incorporated by reference.

TECHNICAL FIELD

The foregoing disclosure relates to a security barrier apparatus that is structured to be installed onto a display fixture to enable secure product display, easy access by customers and inhibit product sweeping. The foregoing disclosure also relates to a secure display system comprising multiple security barriers that are in electronic communication with a main control.

BACKGROUND OF THE INVENTION

Shoplifting is a cost of doing business for retailers and securing inventory while displaying it for consumers is a real challenge. Inventory that is relatively low cost and purchased frequently by consumers is rarely secured and consequently subject to sweeping, where many units of product are stolen at one time. Individually securing these items would be prohibitively expensive using the security devices currently on the market and would result in a large time commitment to employees who are tasked with securing each item in a security device and unsecuring the same when a customer wishes to purchase said item.

Accordingly, there exists a need for a security device and/or system that inhibits product sweeping while also enabling customers to easily access the products being secured without subjecting employees to an undue time burden stocking inventory.

BRIEF SUMMARY

An embodiment of a security barrier apparatus includes an attachment portion structured to couple the security barrier apparatus to a display fixture. The attachment portion includes two extension members each extending from a first end to a second end. A support portion couples to the attachment portion and includes an extension support that is structured to couple to the first end of each of the two extension members. A barrier portion is pivotally coupled to the support portion. The barrier portion includes a barrier frame surrounding a barrier element and a handle coupled to one of the barrier frame and the barrier element. An input device is coupled to the extension support, a control module is coupled to one of the support portion and the attachment portion, and a locking assembly is in communication with the input device and structured to define an unlocked state and a locked state. The control module is structured to be in electrical communication with the input device and the locking assembly and to signal the locking assembly to move to the unlocked state when an input is provided to the input device. The control module is further structured to signal the locking assembly to move to the locked state when an input ceases to be provided to the input device. In the unlocked state, the barrier portion is enabled to be pivoted relative to the support portion between an open and closed position. In the locked state, the barrier portion is inhibited from pivoting relative to the support portion.

In an embodiment, each of the two extension members include a first attachment member comprising an interface with a plurality of adjusters and a second attachment member moveably coupled to the first attachment member at an interface. The adjusters are structured for incremental adjustment of the first attachment member relative to the second attachment member. In an embodiment, the input device is a push button. In an embodiment, a sensor is further included that is structured to determine whether the barrier portion is in the open or closed position. In an embodiment, a dampening device is included that is structured to slow the transition between the open and closed positions. In an embodiment, one or more actuators are included and are in communication with the control module and structured to aid in moving the barrier portion between the open and closed positions. In a further embodiment, the extension support is structured to couple to an extension support of another security barrier apparatus.

Another embodiment of a security barrier apparatus includes an attachment portion structured to couple the security barrier apparatus to a display fixture, a support portion that couples to the attachment portion and a barrier portion pivotally coupled to the support portion. The barrier portion includes a barrier frame surrounding a barrier element and a handle coupled to one of the barrier frame and the barrier element. An input device is coupled to the support portion, a control module is coupled to one of the support portion and the attachment portion, and a locking assembly is in communication with the input device and structured to define an unlocked state and a locked state. The control module is structured to be in electrical communication with the input device and the locking assembly and to signal the locking assembly to move to the unlocked state when an input is provided to the input device. The control module is further structured to signal the locking assembly to move to the locked state when an input ceases to be provided to the input device. In the unlocked state, the barrier portion is enabled to be pivoted relative to the support portion between an open and closed position. In the locked state, the barrier portion is inhibited from pivoting relative to the support portion.

An embodiment of a security barrier system includes a plurality of security barrier apparatuses. Each of the security barrier apparatus includes an attachment portion structured to couple the security barrier apparatus to a display fixture, a support portion that couples to the attachment portion and a barrier portion pivotally coupled to the support portion. An input device is coupled to the support portion, a control module is coupled to one of the support portion and the attachment portion, and a locking assembly is in communication with the input device and structured to define an unlocked state and a locked state. The system further includes a controller in communication with each control module and structured to transmit instructions to each control module.

In an embodiment, the controller is structured to transmit a lockdown signal to each of the plurality of security barrier apparatuses to inhibit movement of the barrier portion relative to the support portion. In an embodiment, the system further includes an alarm structured to provide at least one of an (i) audio output and (ii) a visual output when the barrier portion is moved relative to the support portion. In another embodiment, the system further includes a visual indicator configured to indicate a status of one or more of the barrier apparatuses.

BRIEF DESCRIPTION OF THE DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the below drawings.

FIG. 11E is a table indicating some of the components present in one or more embodiments of the control module.

The attached drawings are for purposes of illustration and are not necessarily to scale.

DETAILED DESCRIPTION OF THE INVENTION

The following discussion relates to embodiments of a security barrier apparatus and associated barrier system. It will be readily apparent that these embodiments are merely examples and that numerous variations and modifications are possible that embody the inventive aspects discussed herein. To that end, other variations and modifications will be readily apparent to those of sufficient skill in the field. In addition, a number of terms are used throughout this discussion in order to provide a suitable frame of reference with regard to the accompanying drawings. These terms such as "first," "second," "top," "bottom," "forward," "rearward," "interior," "exterior," "front," "back" and the like are not intended to limit these concepts, except where so specifically indicated. The terms "about" or "approximately" as used herein may refer to a range of 80%-125% of the disclosed or claimed value. With regards to the drawings, their purpose is to depict salient features of the security barrier and associated barrier system and are not specifically provided to scale, and should not be relied upon for scaling purposes.

Figure 8:
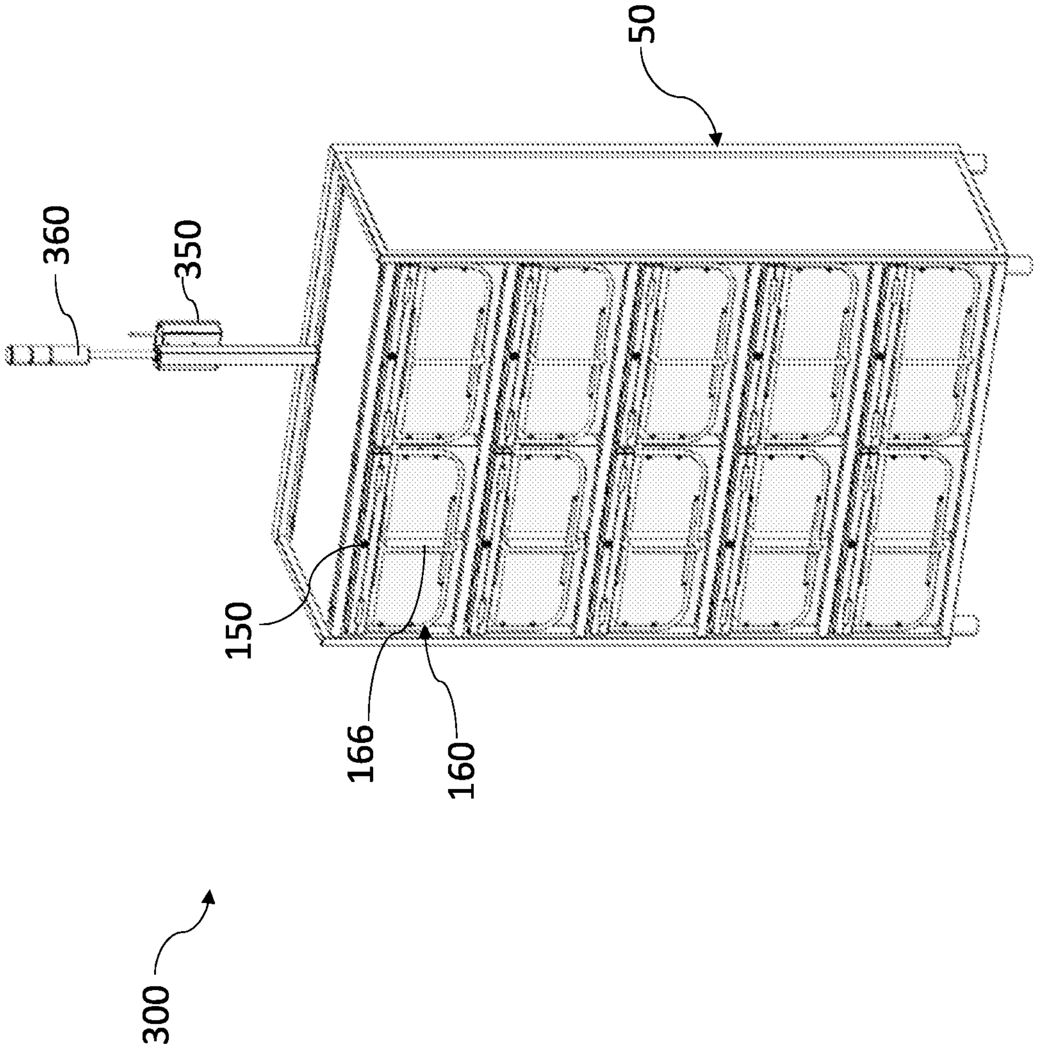
FIG. 8 illustrates a front perspective view of an embodiment of a barrier security system.
Figure 9:
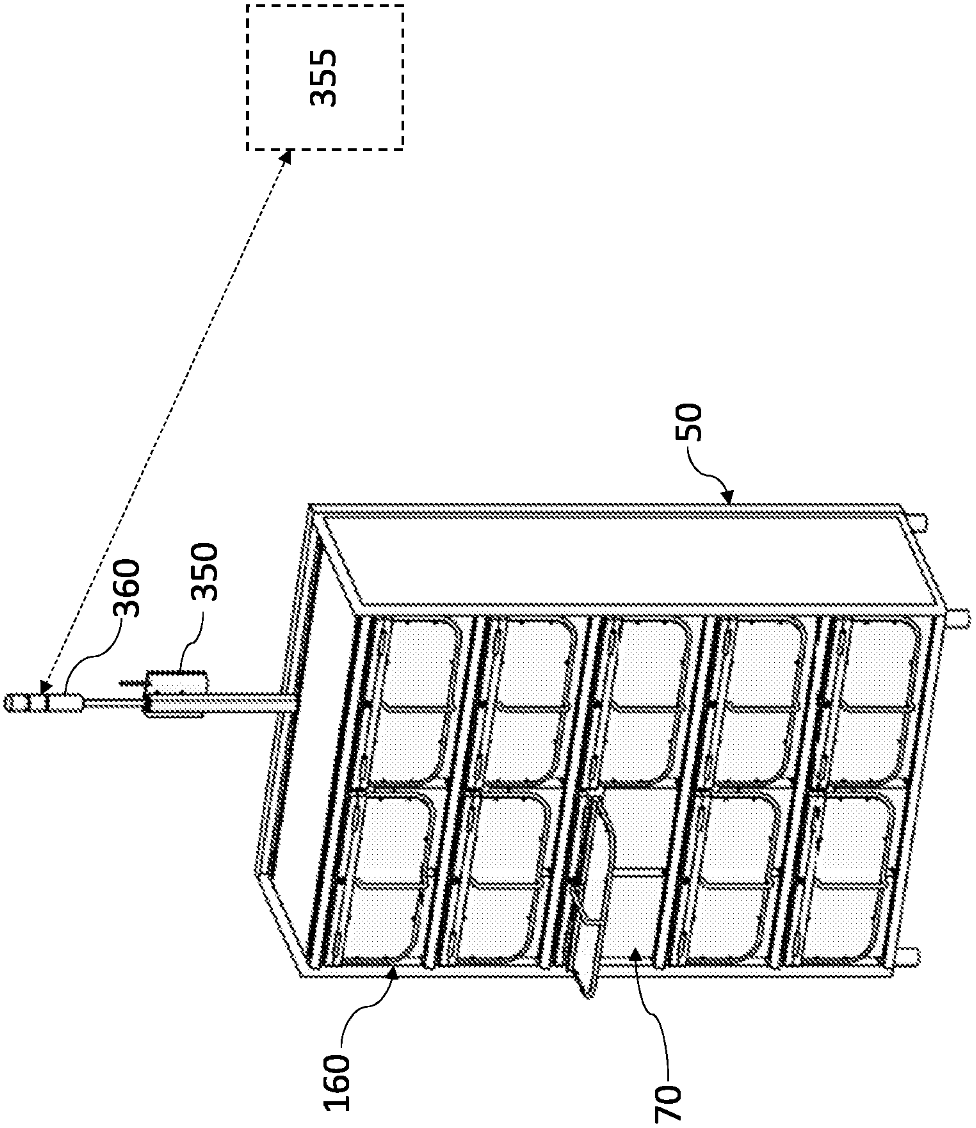
FIG. 9 illustrates another view of the embodiment of FIG. 8.

Referring to FIGS. 1-5A illustrate an embodiment of the security barrier apparatus 100 generally includes: (1) an attachment portion 120 that attaches the security barrier apparatus 100 to a display fixture 50 (FIGS. 8 and 9); (2) a support portion 140 that couples to the attachment portion 120; and (3) a barrier portion 160 pivotally coupled to the support portion 140.

As shown, the attachment portion 120 includes first and second extension elements 120*a*, 120*b*. As shown, the first and second extension elements 120*a*, 120*b* are similar and comprise similar components. The first and second extension elements 120*a*, 120*b* each include a first attachment member 122 and a second attachment member 124 that is moveably coupled to the first attachment member 122 at an interface 125. The first attachment member 122 has a first end 121 with a first bracket 122*a* and an opposing second end 123. The second attachment member 124 includes a first end 126 and an opposing second end 127. The second end 127 defines a mount 128 that has a plurality of openings 129 that traverse the mount 128. The second end 123 of the first attachment member 122 and the first end 126 of the second attachment member 124 define an interface 125 where the first interface surface 125*a* and the second interface surface 125*b* move (in this case slide) relative to each other. One or more adjusters 130 enable incremental adjustment and position locking of the first attachment member 122 and the second attachment member 124 relative to each. In an embodiment, the first attachment member 122 includes a mount 132 having a plurality of openings 129 that traverse the mount 132. The first end 121 of the first attachment member 122 further includes a coupling interface 134 that is structured to couple to the support portion 140.

Still referring to FIGS. 1-5A, the support portion 140 includes an extension 142 or extension support that extends between a first end 141 and a second end 143. The extension 142 has a forward facing surface 144 that faces away from the display fixture when installed and an opposing rearward facing surface 145, as well as a top 147 and a bottom 148 surface. As shown, the support portion 140 is fixedly coupled to the attachment portion 120 at the coupling interface 134 (FIG. 1) such that it does not move relative to the attachment portion 120. The rearward facing surface 145 and/or the top surface 147 is structured to couple to the coupling interface 134 of the attachment members 122. The forward facing surface 144 defines an opening or compartment that is structured to accommodate an input device 150. In an embodiment, the input device 150 is illuminated at least when not in operation. As shown, the input device 150 is a button, however the input 150 may comprise a switch, an interactive display or any other suitable element that is configured to receive an input. The rearward facing surface 145 is further structured to support additional elements such as a lock assembly 180, one or more sensors 190 and a control module 200. The surfaces 144, 145, 146, 147 of the extension 142 may define an interior space (not shown) that is structured to house one or more electrical components such as wiring, on or more actuators, input 150 components, lock assembly 180 components, sensor 190 components, or control module 200 components.

Figure 1:
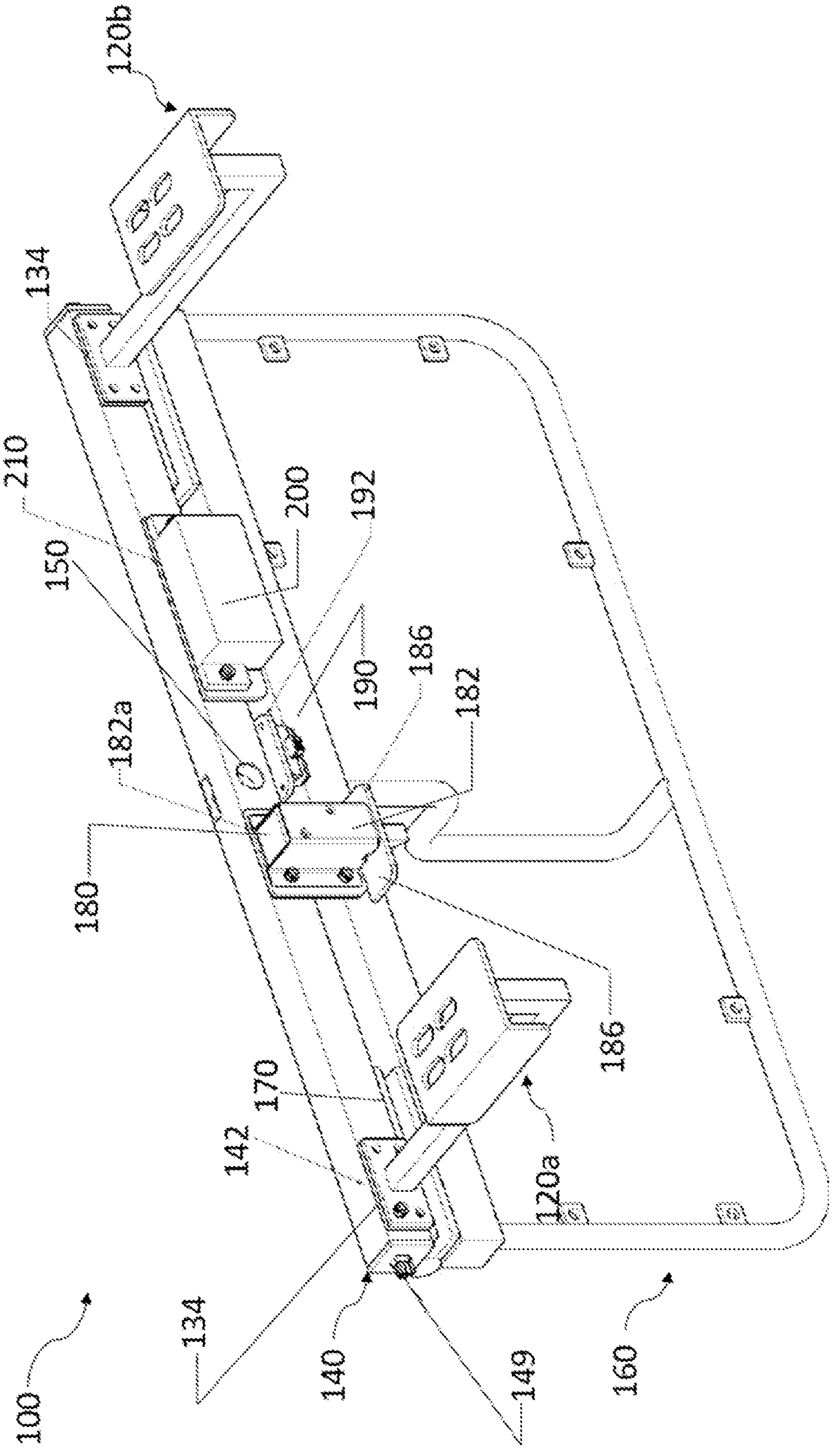
FIG. 1 illustrates a perspective view of an embodiment of a barrier apparatus.
Figure 2:
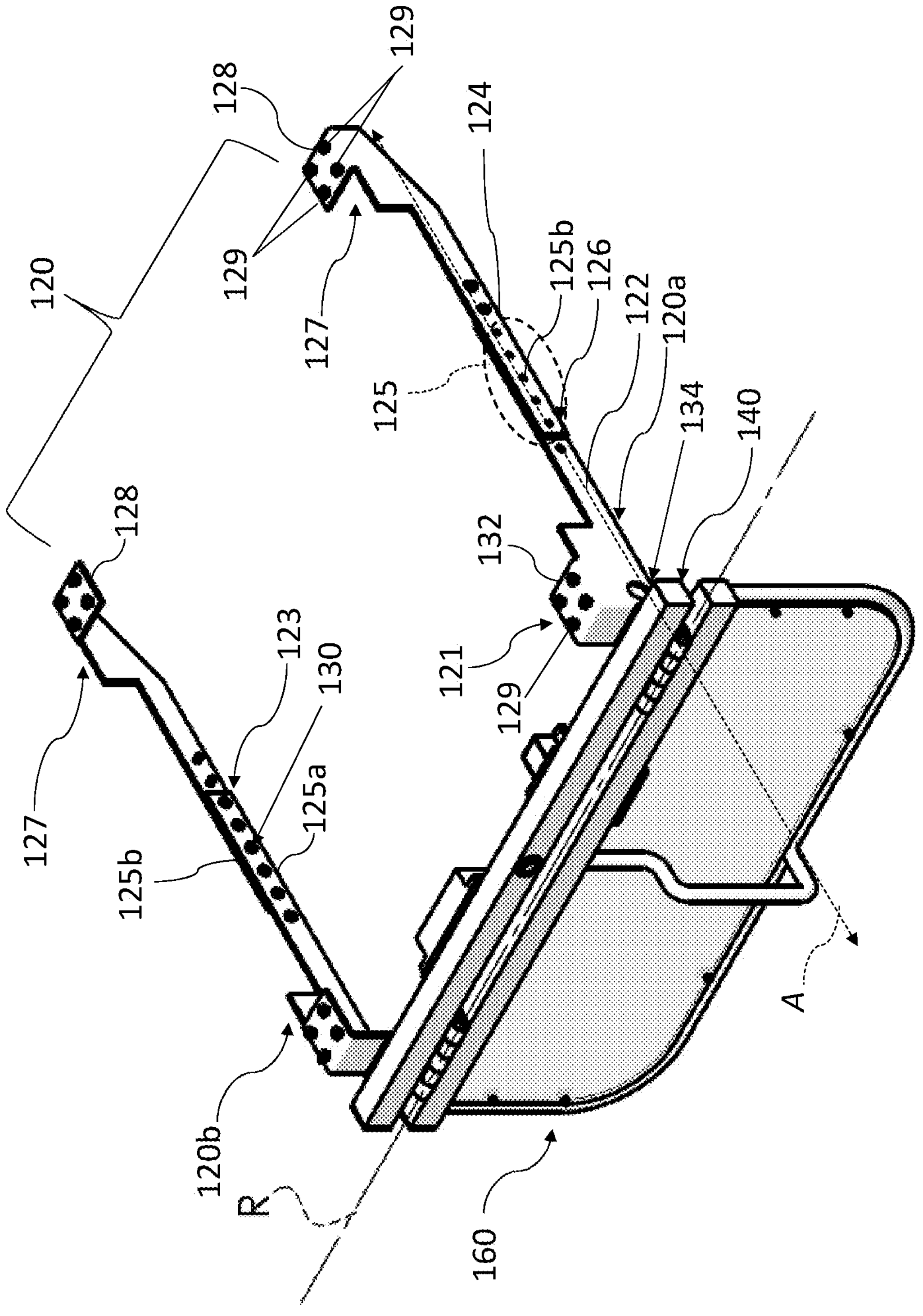
FIG. 2 illustrates a perspective view of an embodiment of a barrier apparatus in a closed position.
Figure 3:
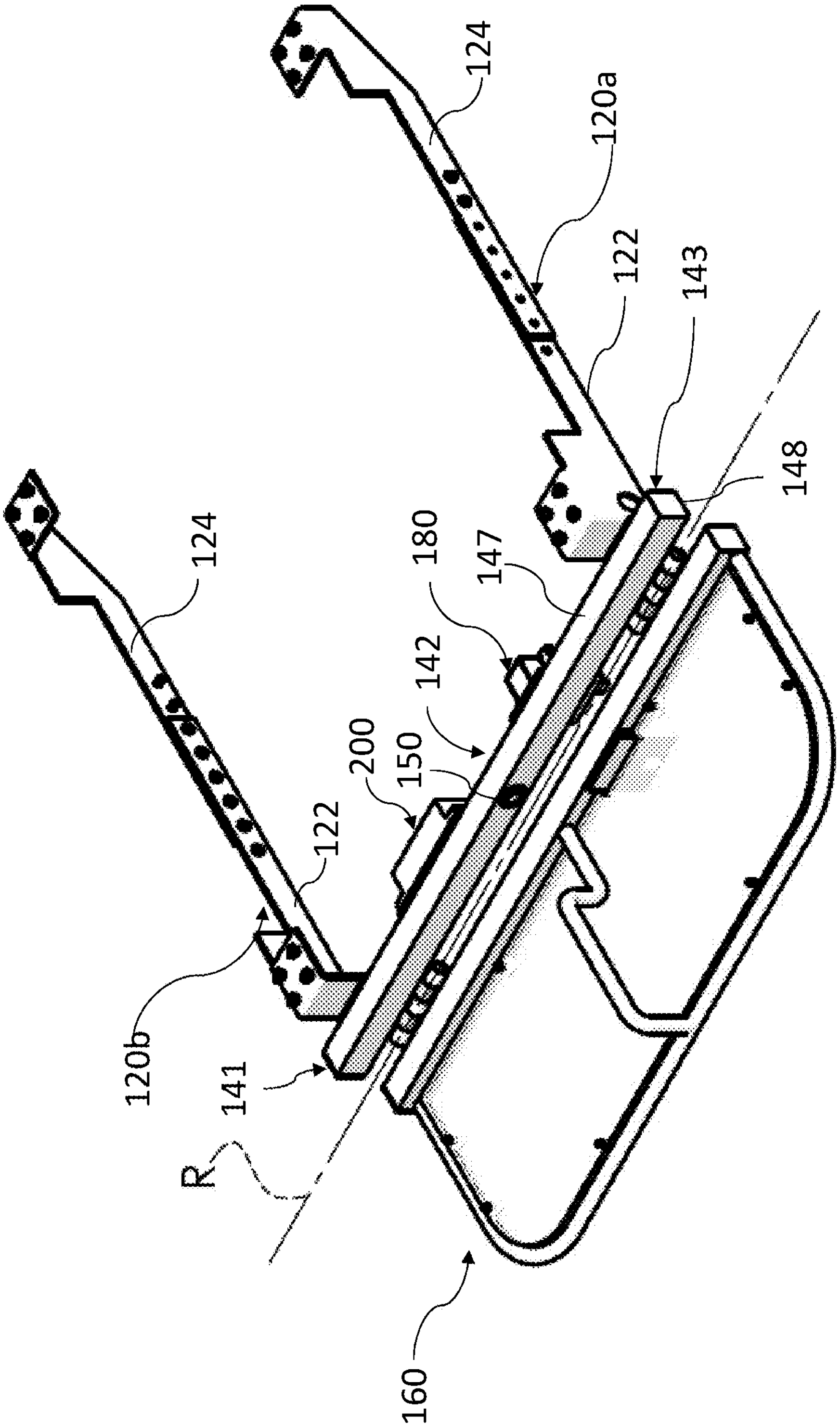
FIG. 3 illustrates a perspective view of an embodiment of a barrier apparatus in an open position.
Figure 4:
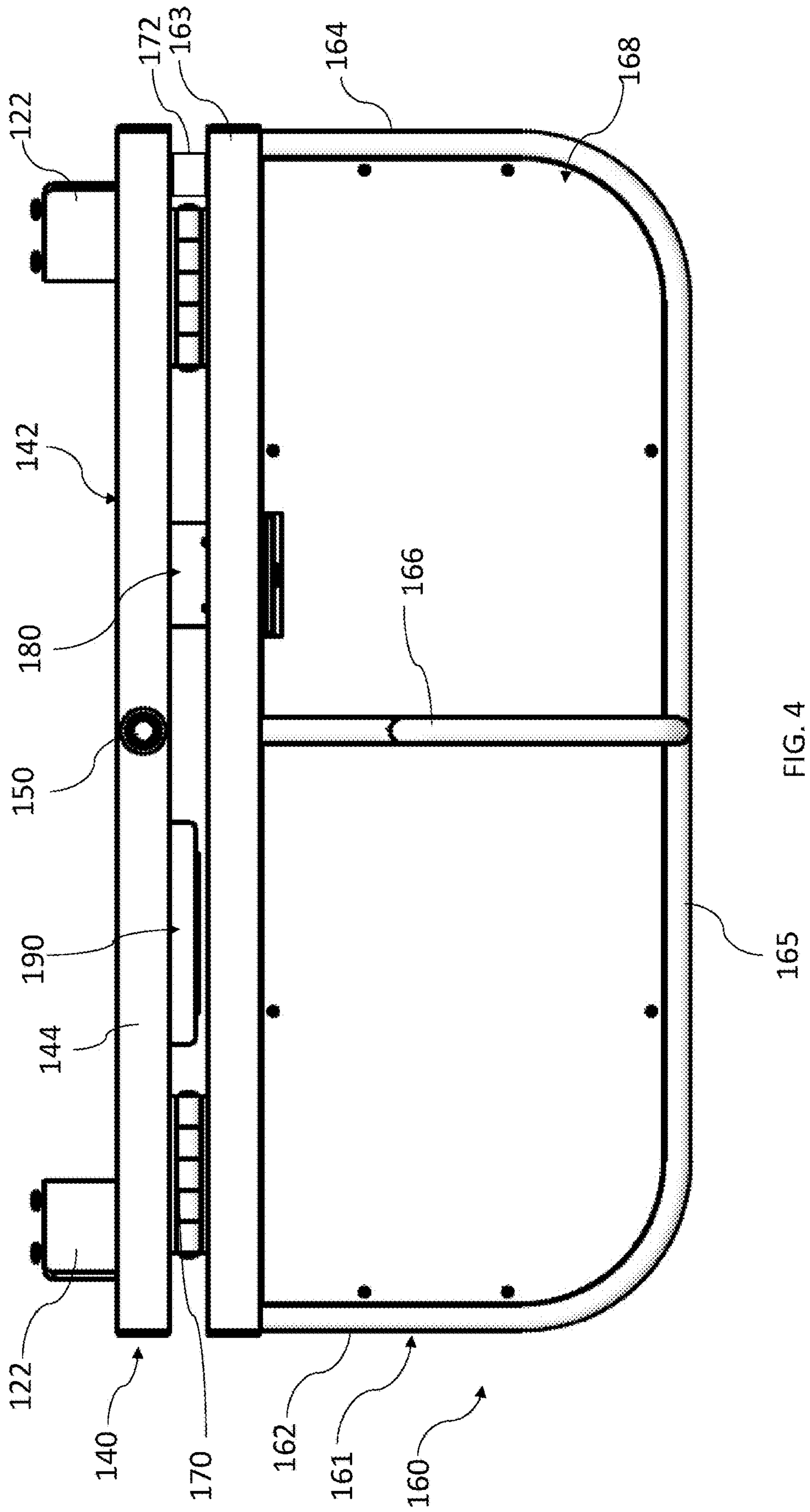
FIG. 4 illustrates a front view of an embodiment of the barrier apparatus.
Figure 5A:
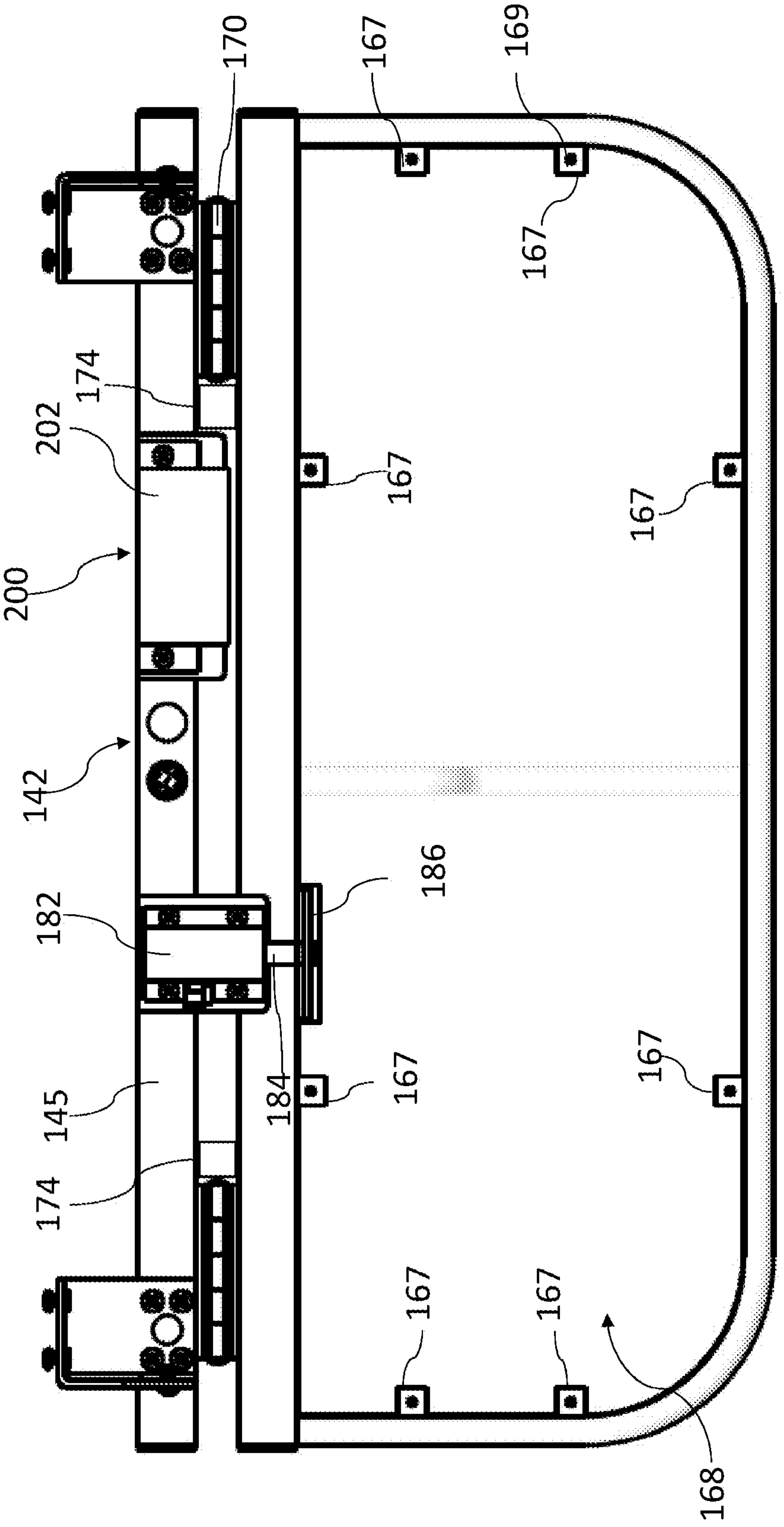
FIG. 5A illustrates a rear view of an embodiment of the barrier apparatus.

As shown in FIGS. 4-5A, the barrier portion 160 generally includes a barrier frame 161, a handle portion 166 configured to aid in actuating the barrier frame 161 relative to the support portion 140, and a barrier element 168 that is at least partially surrounded by and supported by the barrier frame 161. The barrier frame 161 includes first side and second side barrier members 162, 164 and top and bottom barrier members 163, 165. In an embodiment, the barrier members 162, 163, 164, 165 may be formed as a single unit. The barrier frame 161 includes a handle 166 coupled to the barrier frame 161 or formed as a single unit with the barrier frame 161. One or more barrier member supports 167 are positioned on or formed as part of the barrier members 162, 163, 164, 165 and are configured to support a barrier element 168 that is coupled to the one or more barrier member supports 167 using a fastener element 169 such as a safety screw, bolt, an adhesive, or any other element that securely fastens the barrier element 168 to the barrier frame 161. In an embodiment, the barrier element 168 comprises a rigid, transparent material such as Plexiglas®. In another embodiment, the barrier element 168 comprises a grid structure (such as a wire grid) that enables a customer to see through the barrier portion 160, but also inhibits removal of products from the display fixture while the barrier portion 160 is in a closed position as shown in FIG. 2. One or more hinges 170 are structured to pivotally couple the barrier portion 160 to the support portion 140 such that the barrier portion 160 is able to pivot about a pivot axis R (FIG. 2) relative to the support portion 140.

Figure 7B:
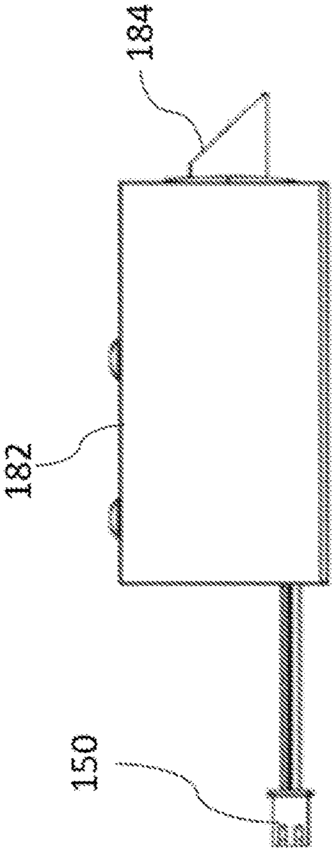
FIG. 7B illustrates a side view of the lock apparatus in an open position.
Figure 7A:
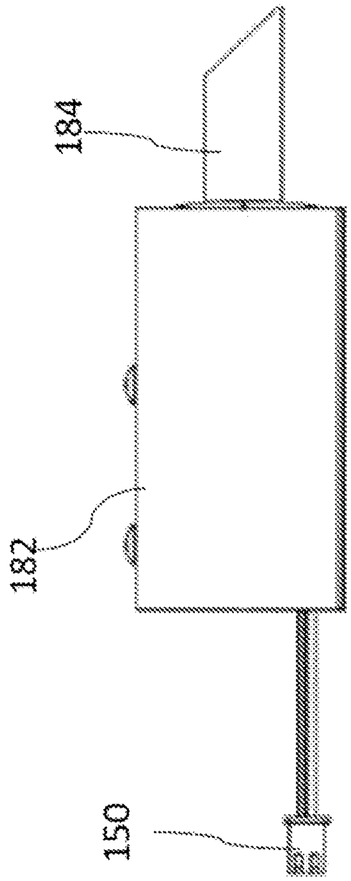
FIG. 7A illustrates a side view of the lock apparatus in a closed position.

As shown in FIGS. 5A and 6-7B, a lock assembly 180 is coupled to the barrier support portion 140 and the frame 161 to enable the barrier apparatus to be in a locked (FIG. 7A) or unlocked state (FIG. 7B). The lock assembly 180 generally includes a housing 182 with a housing bracket 182*a* (FIG. 1) that enables positioning or coupling of the housing 182 to the support portion 140. The housing 182 at least partially encloses a solenoid 183 operatively coupled to a lock bolt 184 or strike bolt. The lock assembly 180 is in electrical communication with the input 150 such that when an input is provided (such as depression of the button), the solenoid 183 is powered, which causes the lock bolt to be drawn towards the housing 182 as shown in FIG. 7B, which unlocks the barrier apparatus 100. In the unlocked state, the barrier portion 160 may be lifted or opened to enable removal of a product. In general, when the input ceases to be provided (for example, when the button is released), the solenoid 183 is no longer powered and the lock bolt 184 is biased to extend or move away from the housing 182 as shown in FIG. 7A to engage a lock plate 186 or strike plate positioned on the barrier portion 160 to lock the barrier apparatus 100. In the locked state, the barrier portion 160 is inhibited from moving or pivoting relative to the support portion 140.

Figure 5B:
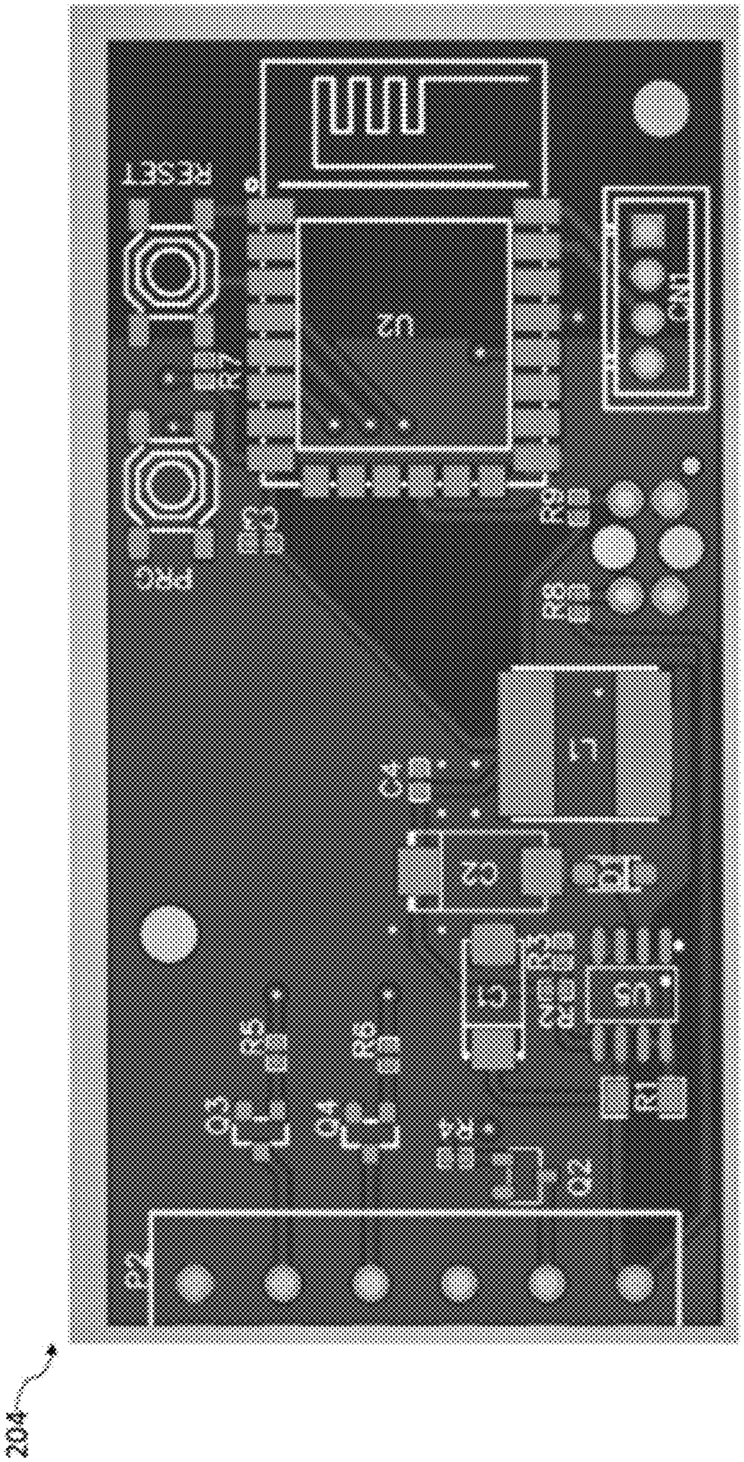
FIG. 5B illustrates a top plan view of an embodiment of a control module board for a control module of the barrier apparatus.
Figure 6:
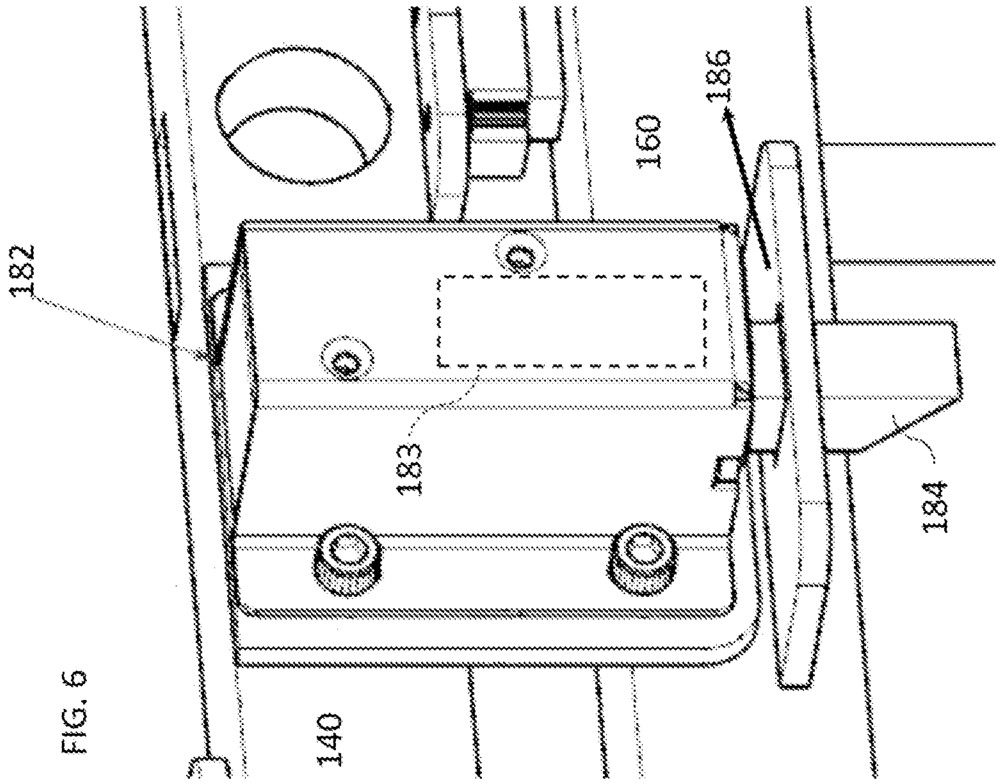
FIG. 6 illustrates a close-up view of an embodiment of a lock assembly for the barrier apparatus.
Figure 11B:
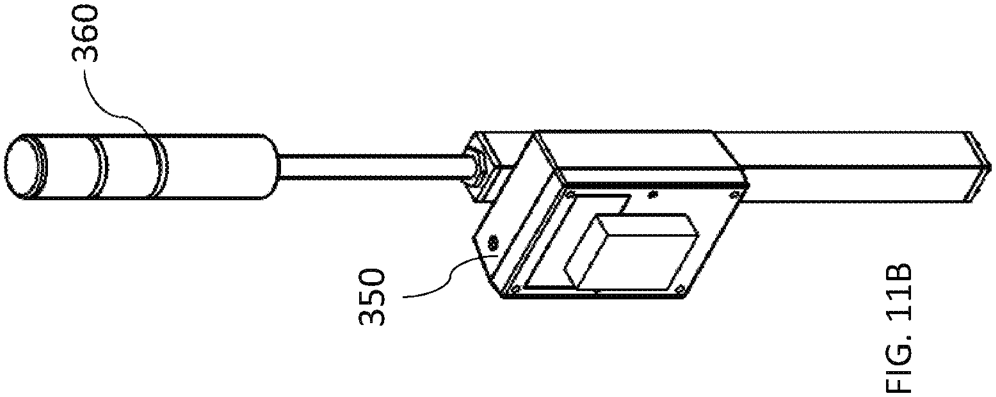
FIG. 11B illustrates another perspective view of an embodiment of a controller and an antenna of FIG. 11A.
Figure 11A:
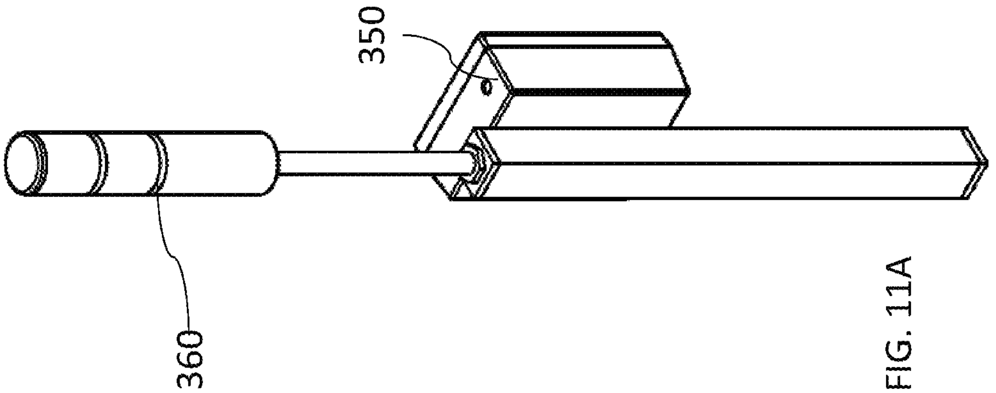
FIG. 11A illustrates a perspective view of an embodiment of a controller and an antenna of the barrier security system.
Figure 11D:
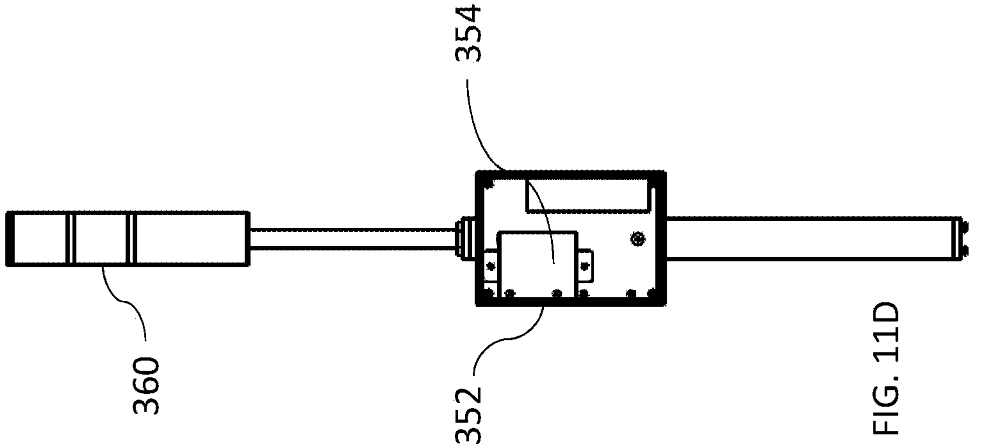
FIG. 11D illustrates a cross section of the controller along line A-A.
Figure 11C:
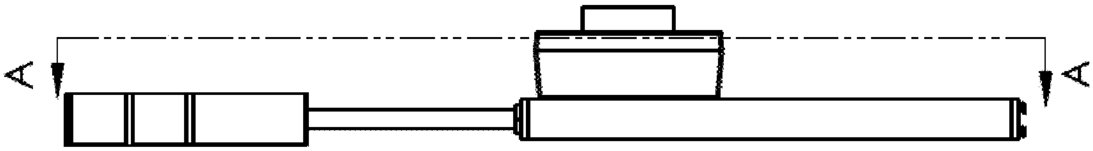
FIG. 11C illustrates another perspective view of an embodiment of a controller and an antenna of FIG. 11A.

One or more sensors 190 (FIGS. 1 and 4) are positioned on the support portion 140 and/or the barrier portion 160 and are structured to indicate whether the barrier apparatus 100 is in the open position (FIG. 3), or whether it is in the closed position (FIG. 2). A control module 200 (FIGS. 1, 3 and 5A) is configured to be positioned on the barrier apparatus 100. In the embodiment shown, the control module 200 (FIGS. 1, 3 and 5A) is positioned on the rearward facing surface 146 of the support portion 140. The control module 200 (FIGS. 1, 3 and 5A) includes a housing 202 that at least partially surrounds one or more components such as a control module board 204 as shown in FIG. 5B. The control module board 204 may comprise a variety of components such as, but not limited to, those shown in FIG. 11E. The control module 200 (FIGS. 1, 3 and 5A) is configured to be in electrical communication with the lock assembly 180 and/or the one or more sensors 190. In an embodiment, the barrier apparatus 100 includes one or more actuators that may act to automatically open and/or close the barrier apparatus 100.

Referring to FIGS. 1-5A, prior to installation on a display fixture 50 (FIGS. 8 and 9), the barrier apparatus 100 is assembled such that the attachment portion 120 is coupled to the support portion 140, which in turn is pivotally coupled to the barrier portion 160. To install the barrier apparatus 100 onto a display fixture 50, the attachment portion 120 is coupled to the display fixture 50 (FIGS. 8 and 9) at the mount 128 using one or more fasteners inserted through the plurality of openings 129. The first attachment member 122 is then moved relative to the second attachment member 124 to adjust the position of the support portion 140 and the barrier portion 160 along an adjustment axis A (FIG. 2) that intersects the axis of rotation R of the barrier portion 160. In some embodiments, the attachment portion 120 may be further attached to the display fixture 50 at the second mount 132 using one or more fasteners inserted through the plurality of openings 129. In this manner, the barrier apparatus 100 is now attached to the display fixture 50 via the attachment portion 120.

Operation of the barrier apparatus 100 will now be explained with reference to FIGS. 1-7B. The default position of the barrier apparatus 100 is the closed position as shown in FIG. 2. When in the closed position, a customer is inhibited from accessing the units of product on the display fixture 50 (FIGS. 8 and 9) because the barrier portion 160, and specifically the barrier element 168, is positioned between the customer and the units of product 70 (FIG. 9). When the customer wishes to access a unit of product 70 (FIG. 9), the customer provides an input (such as a pressing force) at the input device 150. The input 150 acts to initiate power to the solenoid 183 of the lock assembly 180, which withdraws the lock bolt 184 from the lock plate 186, thereby unlocking the barrier apparatus 100. The customer then grasps the handle 166 ant lifts up the barrier portion 160 with one hand, leaving the other hand free to grab a unit product 70 (FIG. 9) from the display fixture 50 (FIGS. 8 and 9). When the customer releases the barrier portion 160 it returns to the closed position (FIG. 2). A dampening mechanism 172 (FIG. 4) may be included to slow the transition of the barrier portion 160 from the open position to the closed position in order to avoid slamming of the barrier portion 160 into the display fixture 50 (FIGS. 8 and 9) or another part of the barrier apparatus 100. A sensor 190 recognizes when the barrier portion 160 returns to the closed position and communicates such to the control module 200, which in turn transmits a signal to lock assembly 180 that cuts the power from the solenoid 183. When the solenoid 183 is not powered, the lock bolt 184 biased into engagement with the lock plate 186 to lock the barrier apparatus 100 in the closed position.

In an embodiment, the input device 150 also activates one or more actuators 174 (FIG. 5A) which act to move the barrier portion 160 relative to the display fixture 50 (FIGS. 8 and 9). In this case, when the customer applies the input to the input device 150, the barrier portion 160 opens. As long as the customer continues to apply input to the input device with one hand, the barrier portion 160 remains open and the customer is able to remove a unit of product 70 (FIG. 9) with their other, free hand. When the customer stops applying the input, the one or more actuators 174 (FIG. 5A) close the barrier portion 160 and it is locked in a similar manner as previously described. The position of the one or more actuators 174 (FIG. 5A) may vary with different embodiments of the barrier apparatus 100 to suit the needs and configuration of various installations.

FIGS. 8 and 9, show a display fixture 50 with a plurality of barrier apparatuses 100 installed in a system 300. The barrier apparatuses 100 are further structured to removable couple to each other in a "daisy chain" manner using connectors 149 (FIG. 1) positioned at the ends 141, 143 of the support portion 140. In this manner a display fixture 50 can be configured to securely display many different types of products 70 and a customer only needs to open the barrier apparatus 100 that corresponds to the desired products 70. This can be seen in FIG. 8, where only one barrier apparatus 100 has been opened. As shown in FIGS. 8-9 and 11A-111D, the system 300 further includes a controller 350 and an antenna 360 or transmitter that receives and transmits signals to a central monitor 355. The controller 350 is electrically connected with each control module 200 as well as the antenna 360 and is configured to control individual barrier apparatuses 100 via signals received by the antenna 360 as well as transmit information about individual barrier apparatuses 100, units of product 70, and or the display fixture 50 to the central monitor 355. In some embodiments, the system 300 includes multiple display fixtures 50 like the ones shown which may be in electrical communication with each other.

Figure 10:
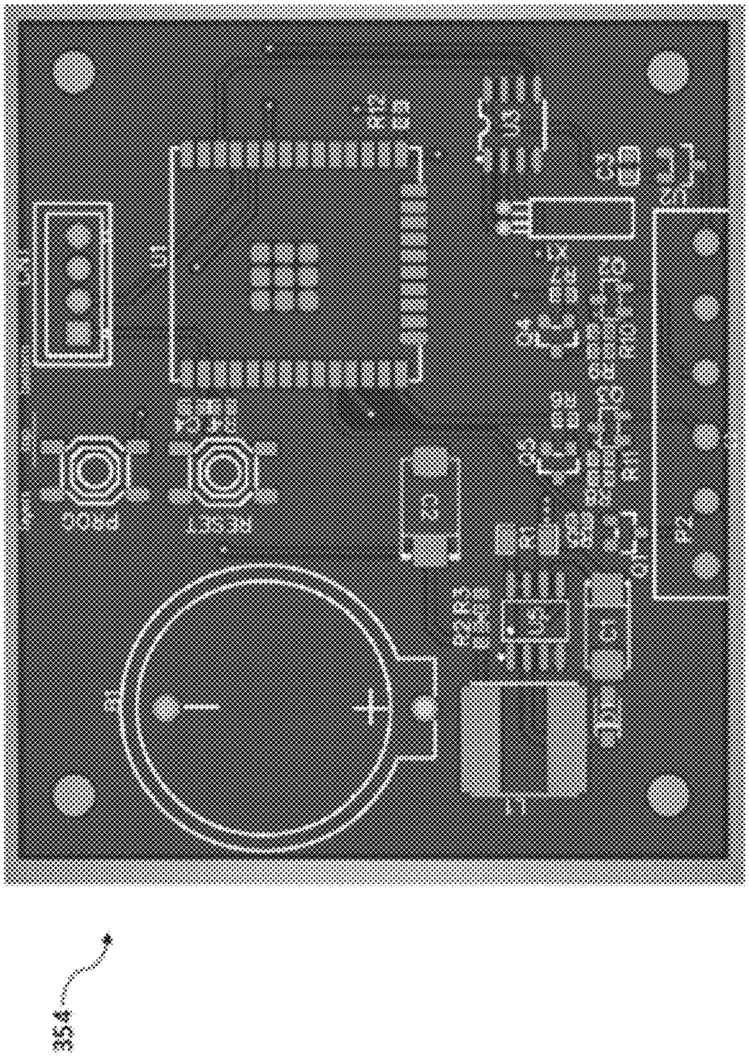
FIG. 10 illustrates a top plan view of another embodiment of a control module board for a control module of the barrier apparatus.

The controller 350 as shown, includes a housing 352 that surrounds components such as a control module board 354 shown in FIG. 10. The control module board 354 may comprise a variety of components such as, but not limited to, those shown in FIG. 11E. Communication between the components may be through any known communications protocol.

Another embodiment of the barrier apparatus 400 will now be discussed with reference to FIGS. 12-19B. Several of the components of the barrier apparatus 400 are similar to those previously discussed and will not be discussed in great detail.

Figure 16:
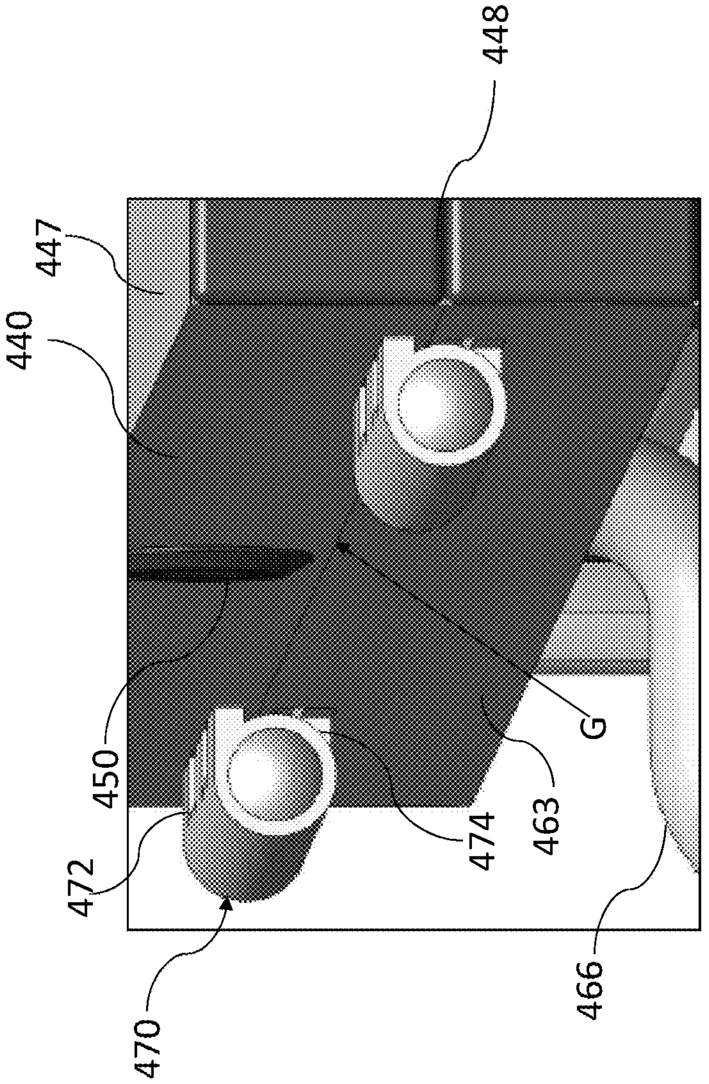
FIG. 16 illustrates a close-up view of a portion of the barrier apparatus of FIG. 12.
Figure 17:
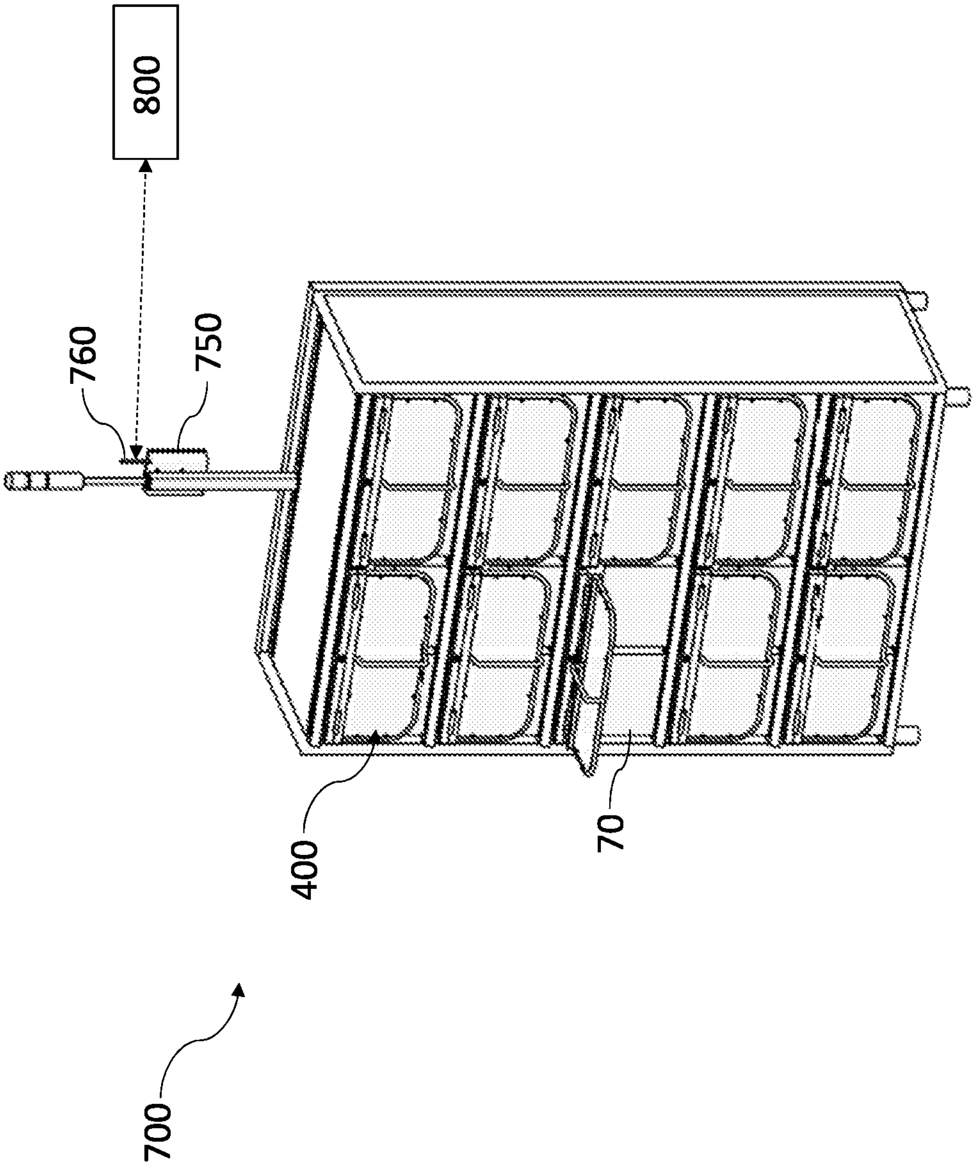
FIG. 17 illustrates a perspective view of another embodiment of the barrier security system.
Figures 18A, 18B:
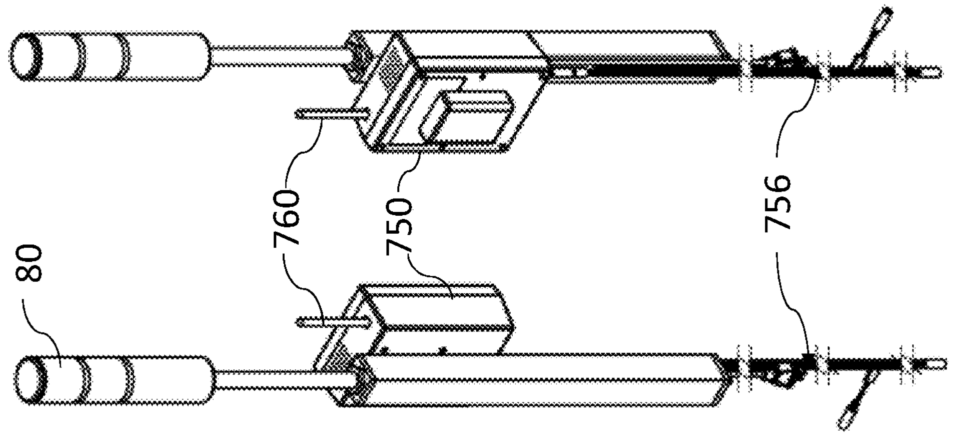
FIG. 18A illustrates side views of an embodiment of a controller and an antenna of the barrier security system of FIG. 17.
FIG. 18B illustrates another view of the embodiment of FIG. 18A.
Figures 19A, 19B:
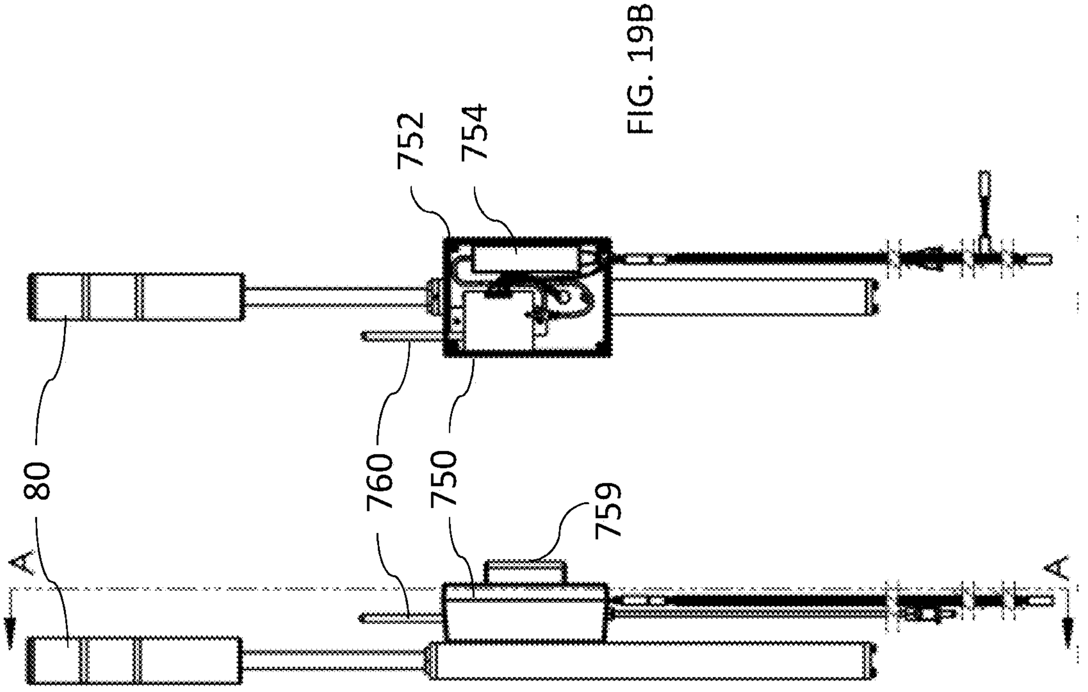
FIG. 19A illustrate a side view of the controller and the antenna of the barrier security system of FIGS. 18A and 18B.
FIG. 19B illustrates a cross section of the controller of FIG. 19A along line A-A.

FIGS. 12-16 illustrate another embodiment of the security barrier apparatus 400, which generally includes: (1) an attachment portion 420 that attaches the security barrier apparatus 400 to a display fixture 50 (FIG. 17); (2) a support portion 440 that couples to the attachment portion 420; and (3) a barrier portion 460 that pivotally couples to the support portion 440.

Similar to the embodiments previously discussed, the attachment portion 420 includes first and second extension elements 420*a*, 420*b*. As shown, the first and second extension elements 420*a*, 420*b* are similar and comprise similar components. The first and second extension elements 420*a*, 420*b* includes a first attachment member 422 and a second attachment member 424 that is moveably coupled to the first attachment member 422 at an interface 425. The first attachment member 422 has a first end 421 and an opposing second end 423. Likewise, the second attachment member 424 includes a first end 426 and an opposing second end 427. The second end 427 of the second attachment member 424 defines a mount 428 that has a plurality of openings 429 that traverse the mount 428. The second end 423 of the first attachment member 422 and the first end 426 of the second attachment member 424 define the interface 425 where the first interface surface 425*a* and the second interface surface 425*b* move (in this case slide) relative to each other. One or more adjusters 430 enable incremental adjustment and position locking of the first attachment member 422 and the second attachment member 424 relative to each. The adjusters 430 may be spaced apart at any desired increment to enable customized position adjustment relative to the display fixture 50 (FIG. 17). In an embodiment, the first attachment member 422 further includes a mount 432 defining a plurality of openings 429 that traverse the mount 432 similar to the mount 428 of the second attachment member 424. Each of the openings is configured to receive a fastener to couple to the display fixture 50 (FIG. 17). The first end 421 of the first attachment member 422 further includes a coupling interface 434 that is structured to couple to the support portion 440.

The support portion 440 is structured similar to other embodiments previously discussed and includes an extension 442 that extends between a first end 441 and a second end 443. The extension 442 has a forward facing surface 444 that faces away from the display fixture 50 (FIG. 17) when installed on the display fixture 50 (FIG. 17), and an opposing rearward facing surface 445, as well as a top surface 447 and a bottom 448 surface. As shown, the support portion 440 is fixedly coupled to the attachment portion 420 such that it does not move relative to the attachment portion 420. The rearward facing surface 445 and/or the top surface 447 is structured to couple to the coupling interface 434 of the first attachment members 422. In some embodiments, the support portion 440 and the first attachment members 422 may be formed as a single unitary component. The forward facing surface 444 defines an opening or compartment that is structured to at least partially accommodate an input device 450. The input device 450 may be at least partially illuminated during operation. As shown, the input device 450 is a push button, however the input device 450 may comprise a switch, an interactive display, a sensor, or any other suitable element that is configured to receive an input. The rearward facing surface 445 is further structured to support additional elements such as a lock assembly 480, one or more sensors 487 (FIG. 14B) and a controller or control module 600. The surfaces 444, 445, 447, 448 of the extension 442 may define an interior space (not shown) that is structured to house one or more electrical components such as wiring, one or more actuators, input device 450 components, lock assembly 480 components, sensor components, and/or control module 600 components.

Figure 14A:
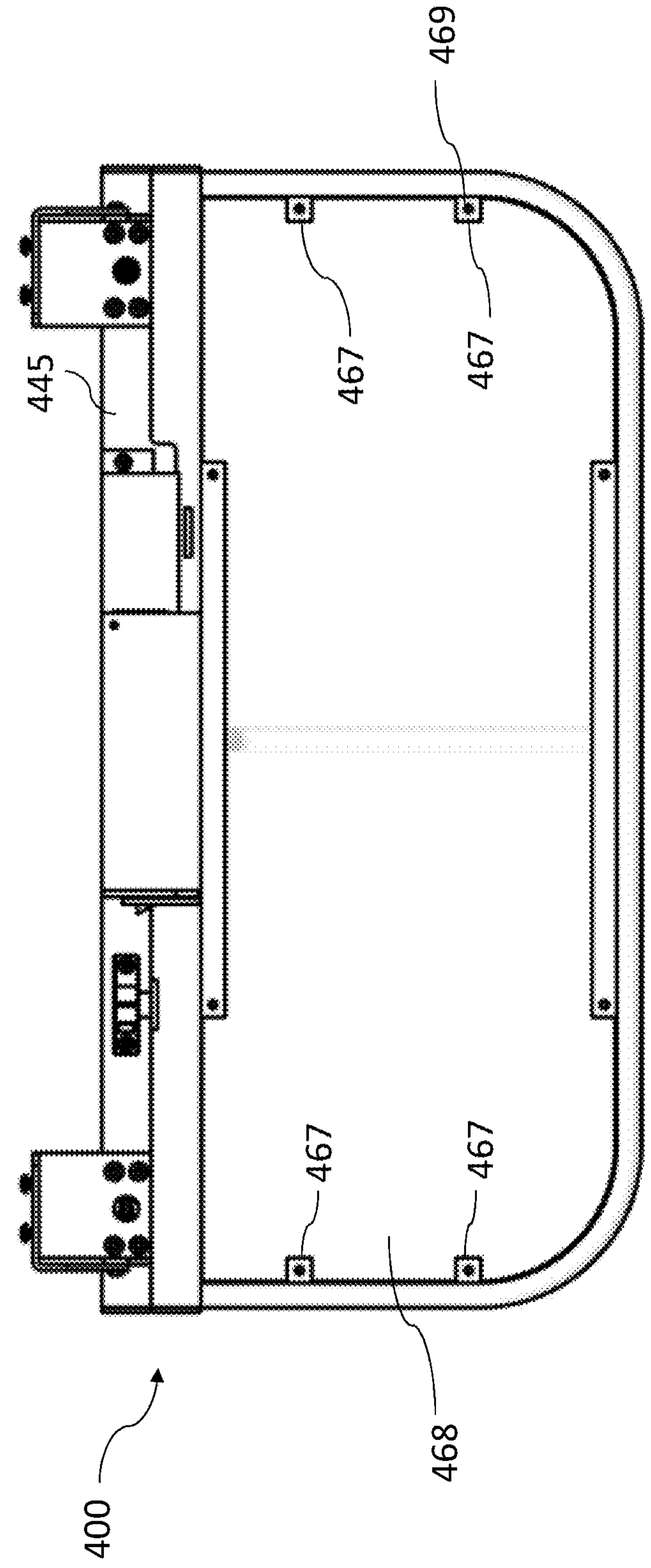
FIG. 14A illustrates a rear elevational view of the barrier apparatus of FIG. 12.
Figure 14B:
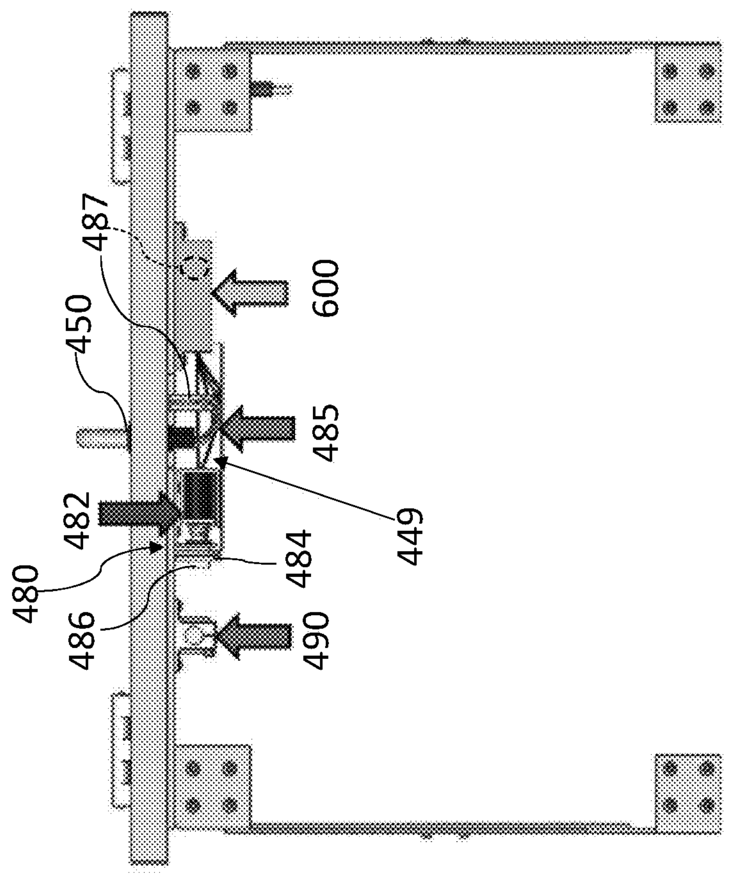
FIG. 14B illustrates a top plan view of the barrier apparatus of FIG. 12.
Figure 15:
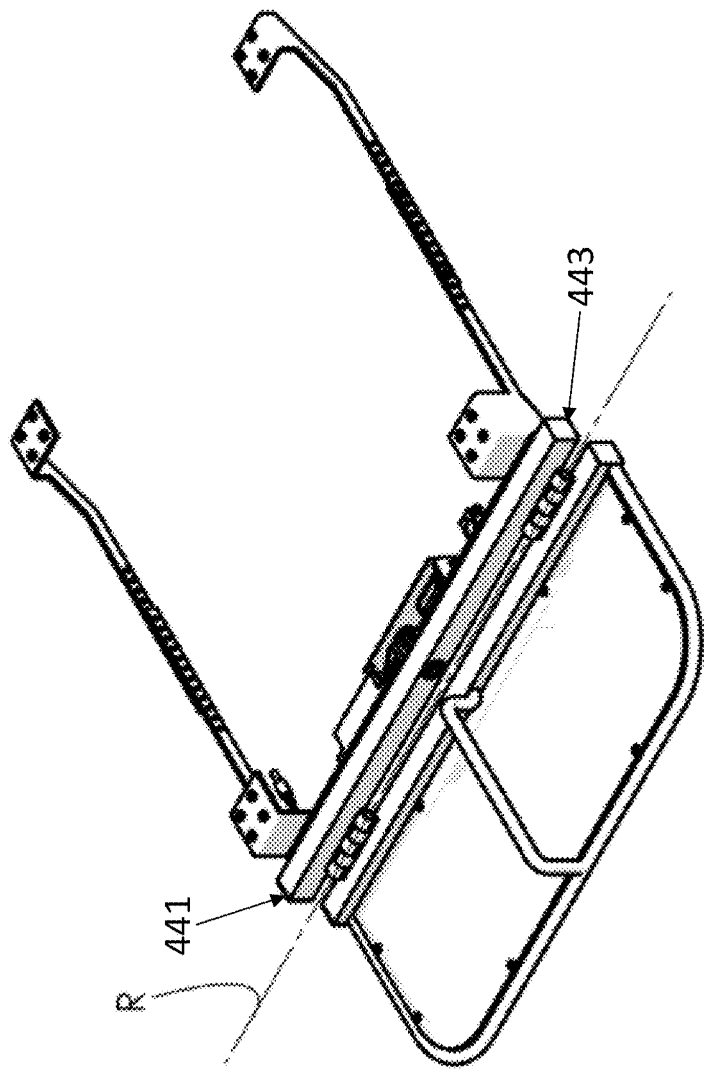
FIG. 15 illustrates a perspective view of the barrier apparatus of FIG. 12 in the open position.

Referring specifically to FIG. 14B, the lock assembly 480 includes a locking device 482 operatively coupled to a locking member 486, and a locking member engager 484 that is structured to engage the locking member 486 when the lock assembly is in a locked state. In an embodiment, the locking device 482 includes a solenoid that is in electrical communication with an electrical source, the input device 450 and the control module 600. As shown, the locking device 482 is mounted along the axis of the support portion 440 and is configured to move the locking member 486 to define an unlocked position and the locked position. A guard 485 is positioned along the rearward facing surface 445 of the support portion 440 to delimit a space 449 between the guard 485 and the rearward facing surface 445. The space 449 is dimensioned to accommodate the locking device 482, at least a portion of the locking member 486 and one or more electrical connections between components of the lock assembly 480, the input device 450 and the control module 600 including one or more sensors 487. The guard acts to protect such sensitive components of the barrier apparatus 400 from impacts.

Figure 12:
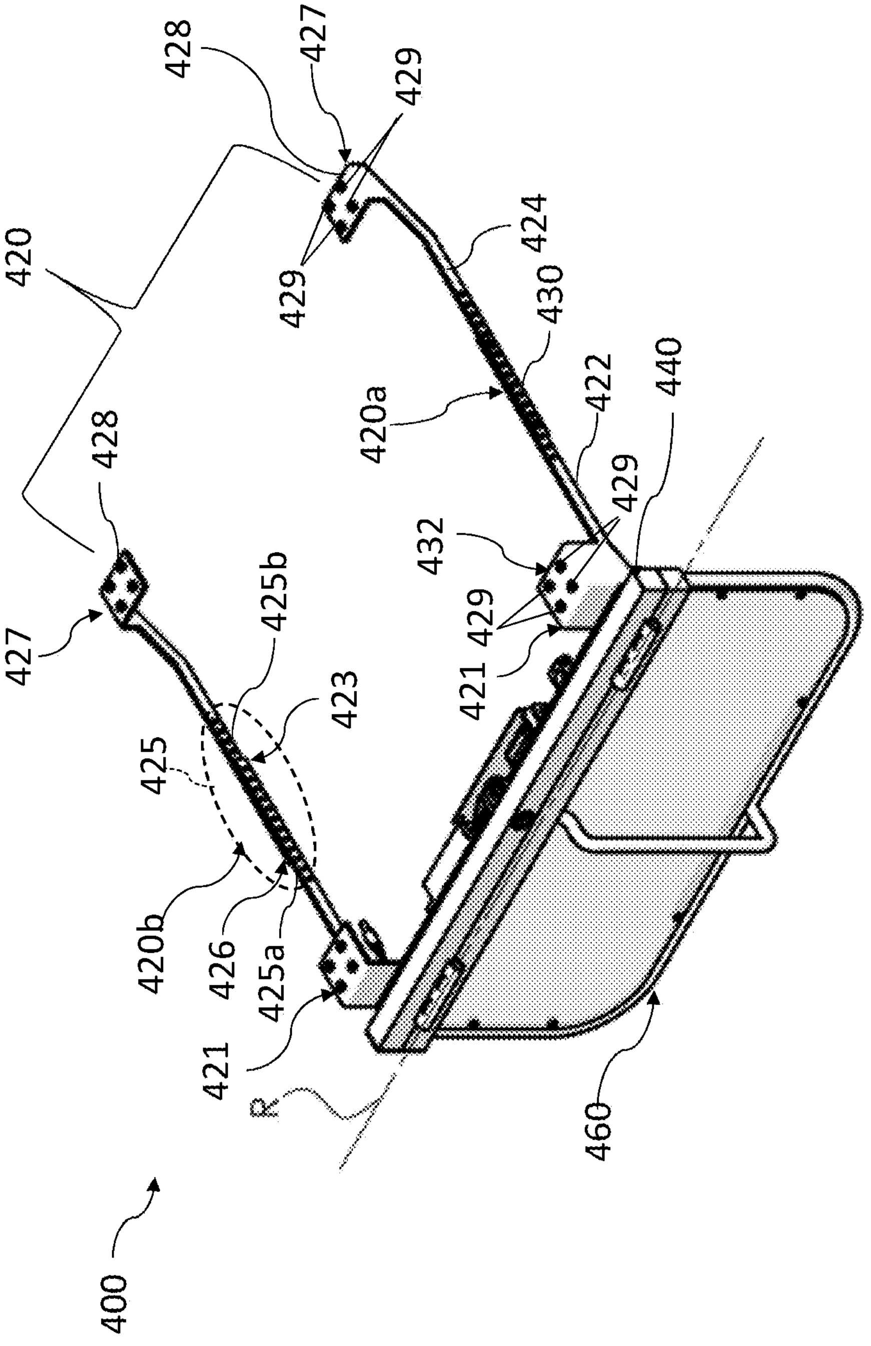
FIG. 12 illustrates a perspective view of another embodiment of the barrier apparatus in the closed position.
Figure 13:
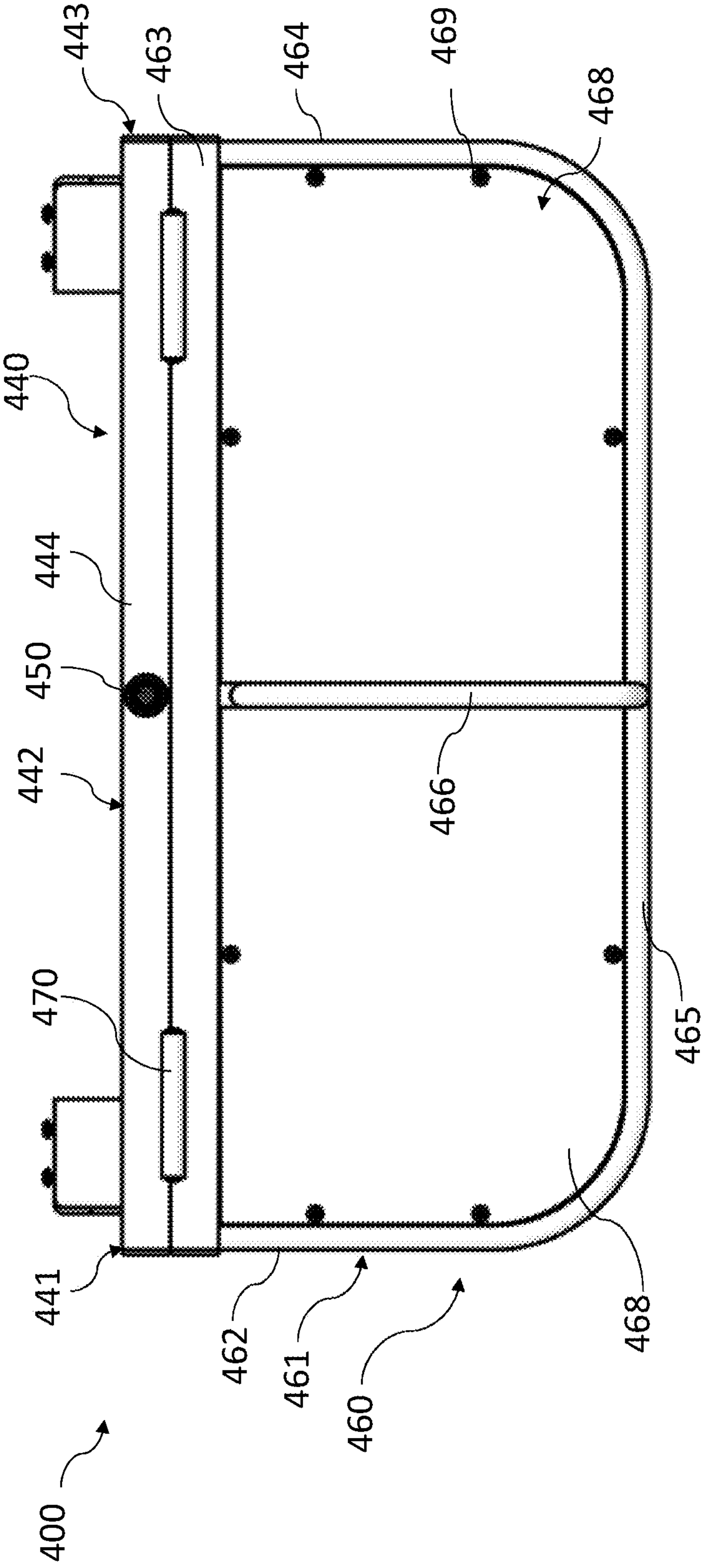
FIG. 13 illustrates a front elevational view of the barrier apparatus of FIG. 12.

Turning to FIGS. 13, 14A, 15 and 16, the barrier portion 460 generally includes a barrier frame 461, a handle portion 466 configured to aid in actuating the barrier frame 461 relative to the support portion 440, and a barrier element 468 that is at least partially surrounded by and supported by the barrier frame 461. The barrier frame 461 includes first side 462, second side 464, top 463 and bottom 465 barrier members. In an embodiment, the barrier members 462, 463, 464, 465 may be formed as a single unit. The handle portion 466 is coupled to the barrier frame 461 or may be formed as a single unit with the barrier frame 461. One or more barrier member supports 467 are positioned on or formed as part of the barrier members 462, 463, 464, 465 and are configured to support a barrier element 468 that is coupled to the one or more barrier member supports 467 using a fastener element 469 such as a safety screw, bolt, an adhesive, or any other element that securely fastens the barrier element 468 to the barrier frame 461. In an embodiment, the barrier element 468 comprises a rigid, transparent material such as Plexiglas®. In another embodiment, the barrier element 468 comprises a grid structure, such as a wire grid, that enables a customer to see through the barrier portion 460, but also inhibits removal of units of product 70 from the display fixture 50 while the barrier portion is in a closed position as shown in FIGS. 12 and 13.

One or more hinges 470 are structured to pivotally couple the barrier portion 460 to the support portion 440 such that the barrier portion 460 is able to pivot relative to the support portion 440. Referring to FIG. 16, the one or more hinges 470 include a first hinge portion 472 and a second hinge portion 474 that are pivotally coupled together. The first hinge portion 472 is at least partially positioned and/or secured within a recess defined in the support portion 440. The second hinge portion 474 is at least partially positioned and/or secured within a recess defined in the top barrier member 463. The positioning of the one or more hinges 470 are such that the gap G defined between the support portion 440 and the top barrier member 463 is minimized, especially when the barrier apparatus 400 is in the closed position as shown in FIG. 16. This inhibits tampering with the barrier apparatus 400 by inserting a tool or a body part into or through the gap G. Moreover, reduction or minimization of the gap G inhibits body parts from being trapped or pinched between the support portion 440 and the top barrier member 463.

One or more sensors 487, such as optical sensors, are positioned within or proximate the control module 600 (FIG. 14B) and are structured to indicate whether the barrier apparatus 100 is in the open position (FIG. 15), or whether it is in the closed position (FIGS. 12, 13, 14A and 16). Positioning the one or more sensors 487 in the control module 600 enables easier installation/assembly of the barrier apparatus 400 in addition to requiring fewer components. The control module 600 is configured to be positioned on the barrier apparatus 400, such as on the rearward facing surface 445 of the support portion 440. The control module 600 may be generally structured similar to previously described embodiments with similar components. The control module 600 is configured to be in electrical communication with the lock assembly 480 and the input device 450. In an embodiment, the barrier apparatus 400 includes one or more actuators, such as those shown in previous embodiments, that may act to automatically open and/or close the barrier apparatus 400.

The barrier apparatus 400 is assembled and installed onto a display fixture 50 (FIG. 17) in a manner similar as that previously discussed. Operation of the barrier apparatus 400 will now be explained with reference to FIGS. 12-16. The default position of the barrier apparatus 400 is the closed position as shown in FIGS. 12-14A. When in the closed position, the customer is inhibited from accessing the units of product 70 (FIG. 17) on the display fixture 50 (FIG. 17) because the barrier portion 460, specifically the barrier element 468, is positioned between the customer and the units of product 70 (FIG. 17). When the customer wishes to access a unit of product 70 (FIG. 17), the customer provides an input (such as a pressing force) to the input device 450. Providing an input to the input device 450 transmits a command to the locking device 482 to withdraw the locking member 486 from the locking member engager 484, thereby unlocking the barrier apparatus 400. The customer then grasps the handle portion 466 and lifts up the barrier portion 460 with one hand, leaving the other hand free to grab a unit product 70 (FIG. 17) from the display fixture 50 (FIG. 17). When the customer releases the barrier portion 460, it returns to the closed position (FIGS. 12-14A). as shown in FIG. 14B, a magnetic closing device 490 assists in moving the barrier portion 460 between the open and closed positions, properly aligning the barrier portion 460 relative to the support portion 440 in the closed position, and inhibits the barrier portion 460 from remaining in the open position when not being held in the open position.

The magnetic device 490 may further act as a dampening mechanism (or an additional dampening mechanism may be included as previously described) to slow the transition of the barrier portion 460 from the open position to the closed position in order to avoid slamming of the barrier portion 460 into the display fixture 50 (FIG. 17) or another part of the barrier apparatus 400. The sensor positioned in the control module 600 recognizes when the barrier portion 460 returns to the closed position and communicates such to the control module 600. The control module 600 in turn transmits a signal to lock assembly 480 to cause the locking device 482 to urge the locking member 486 into engagement with the locking member engager 484 to lock the barrier portion 460 in the closed positon. The magnetic closing device 490 aids in the proper closure of the barrier apparatus 400 such that the locking member 486 and the locking member engager 484 are properly aligned. Misalignment of the locking member 486 and the locking member engager 484 will result in an inability of the barrier apparatus 400 to be securely locked in the closed position. When in the closed position, the configuration of the locking device 482 and the lock member being mounted along the axis of the support portion 440 decreases the risk of damage to lock assembly 480 components if the barrier portion 460 is attempted to be pulled open when in the closed and locked state.

In an embodiment, the input device 450 may also activates one or more actuators as previously described, which act to move the barrier portion 460 relative to the display fixture 50 (FIG. 17). In this case, when the customer applies the input to the input device 450, the barrier portion 460 automatically opens. As long as the customer continues to apply the input to the input device 450 with one hand, the barrier portion 460 remains open and the customer is able to remove a unit of product 70 (FIG. 17) with their other, free hand. When the customer stops applying the input, the one or more actuators and/or magnetic closing device 490 close the barrier portion 460 and it is locked in a similar manner as previously described.

FIGS. 17-19B, show a display fixture 50 with a plurality of barrier apparatuses 400 installed in a system 700. The barrier apparatuses 400 are further structured to removably couple to each other in a "daisy chain" manner using connectors 149 (FIG. 1) positioned at the ends 441, 443 (FIG. 15) of the support portion 440. In this manner a display fixture 50 can be configured to securely display many different types of products and a customer only needs to open the barrier apparatus 400 that corresponds to the desired products 70 as can be seen in FIG. 17. The system 700 further includes a system controller 750 and an antenna 760 that receives and transmits signals to a central monitoring station or central monitor 800. The system controller 750 is electrically connected with each control module 600 as well as the antenna 760 and is configured to control individual barrier apparatuses 400 via signals received by the antenna 760 as well as transmit information about individual barrier apparatuses 400, units of product, and or the display fixture 50 to the central processor 800. One or more components of the system 700 are configured for wireless communications using known wireless networking protocols. In some embodiments, the system 700 includes multiple display fixtures 50 which may be in mechanical and/or electrical communication with each other and the central monitor 800.

Referring specifically to FIGS. 18A-19B, the system controller 750 includes a housing 752 that contains at least one of the elements previously discussed. For example, the housing may include a power source 754, an alarm 759 and the control module board 204 (FIG. 5B), 354 (FIG. 10). Additional wiring 756 may electrically couple the system controller 750 and antenna 760 to the controller 600, lock assembly 480 and/or input device 450. A light 80 may be electrically coupled to the system 700, which provides a visual indication of the status of one or more of the barrier apparatuses 400 installed on a display fixture 50.

The central processor 800 may be accessed through a user portal. In an embodiment, the user portal enables a user to enter credentials (username and password), which may determine the amount of information and/or the actions available to the user. For example, a user may be able to set preferences for individual systems 700 and/or individual barrier apparatuses 400. Such preferences may include security preferences. In one example, all barrier apparatuses 400 in the system 700 may be locked for a specified amount of time after the barrier portion 460 of one barrier apparatus 400 is opened a specified number of times within a specified duration of time. The specified times and number of barrier apparatuses 400 involved may be customized through the portal.

It is also possible to set up the system 700 to use visual and/or audio cues to indicate the status of one or more barrier apparatuses 400. It is further possible to bypass such cues and track the operation of the barrier apparatuses 400 that are part of the system 700 through notifications directly to store employees or an administrator. In an embodiment, the barrier apparatuses 400 that are part of the system 700 may be divided into two or more groups which each may be set up with different preferences and different user permissions from each other. The user portal may further enable a complete system lockdown or shutdown where all barrier apparatuses 400 are disabled from being moved from the closed position to the open position. Alternatively, individual barrier apparatuses 400 may be locked and/or unlocked through the user portal. A restock function may be available, which when activated, enables the barrier portion 460 to be opened an unlimited amount of times during a specified time period during a restocking process. In another embodiment, the restock function may act to keep the barrier portion 460 in the open position until the restock function is terminated. The restock function may also automatically terminate after a specified period of time in the event that the user forgets to terminate the function after restocking has been completed.

The barrier system may be set up for timed activities through the user portal. For example, a lockdown and unlocking of one or more of the barrier apparatuses 400 in the system 700 may be timed to coincide with store hours to provide an extra level of product security when the store is closed. The central processor 800 may further maintain an activity log associated with barrier apparatuses 400 that are part of the system 700. Activities such as an alarm activation, barrier apparatus malfunction or inactivation (such as in the case of a power loss or a loss of connectivity) and barrier apparatus opening may be captured in the activity log. Such activity may be accessed through the user portal and may include an indication of the type of activity associated with a specific barrier apparatus 400 as well as the date/time when the activity occurred, and in some instances, who authorized the activity (e.g., who authorized a particular function). In an embodiment, reports may be generated and output using data from the activity log to track various metrics including employee activity, product demand, attempts at theft or damage to individual barrier apparatuses 400 and individual barrier apparatus functionality. Certain activities may trigger a real time notification to store employees and/or an administrator (and the supplier/manufacturer), such as an alarm or a malfunction.

The user portal may further enable the system 700 and each barrier apparatus 400 within the system to be assigned an identification. It may also be possible for barrier apparatuses 400 to be added or removed from the system 700. Likewise, user permissions may be added, removed and changed through the user portal.

It is possible for automatic firmware updates to be sent from the supplier/manufacturer directly to the central processor 800. In the same manner, support personnel are enabled to remotely access the system 700 in order to troubleshoot issues such as malfunctions. Higher level permissions may enable information for multiple systems 700 representing multiple locations to be viewed and accessed.

User permissions may be set up depending on the requests of each client or system 700 owner. Each of the functions discussed may be viewed, implemented and/or customized through the user portal and/or through a remote user, such as the supplier/manufacturer. Certain information such as passwords, information related to specific individuals or products may be protected using known encryption methods for secure transmission.

While the foregoing functions have been explained with reference to one embodiment of the barrier apparatus 400, it is envisioned that such functions can also be performed with other embodiments of the barrier apparatus and corresponding system. In another embodiment, the barrier apparatus is a free standing device for a plug and play installation.

The invention is inclusive of combinations of the aspects described herein. References to an "embodiment" and the like refer to features that are present in at least one aspect of the invention. Separate references to "an embodiment" or "particular aspects" or the like do not necessarily refer to the same aspect or aspects; however, such aspects are not mutually exclusive, unless so indicated or as are readily apparent to one of skill in the art. The use of singular or plural in referring to elements of the disclosed barrier apparatuses is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A security barrier apparatus comprising:
- an attachment portion configured to couple the security barrier apparatus to a display fixture, the attachment portion comprises two extension members extending from a first end to a second end;
- a support portion that couples to the attachment portion, the support portion comprises an extension support that is structured to couple to the first end of each of the two extension members;
- a barrier portion pivotally coupled to the support portion, the barrier portion comprises,
  - a barrier frame surrounding a barrier element, and
  - a handle coupled to one of the barrier frame and the barrier element;
- an input device coupled to the extension support;
- a control module coupled to one of the support portion and the attachment portion; and
- a locking assembly in communication with the input device and structured to define an unlocked state and a locked state,
- wherein the control module is structured to be in electrical communication with the input device and the locking assembly and signal the locking assembly to move to the unlocked state when the input is provided to the input device and further structured to signal the locking assembly to move to the locked state when an input ceases to be provided to the input device,
- wherein in the unlocked state, the barrier portion is enabled to be pivoted relative to the support portion between an open and closed position, and wherein in the locked state, the barrier portion is inhibited from pivoting relative to the support portion.

2. The security barrier apparatus of claim 1, wherein each of the two extension members comprise,
- a first attachment member comprising a first interface with a plurality of adjusters, and
- a second attachment member comprising a second interface configured to engage the first attachment member at the first interface,
- wherein the first and second interfaces are configured for incremental adjustment to move the first attachment member and the second attachment member relative to each other.

3. The security barrier apparatus of claim 1, wherein the input device comprises a push button.

4. The security barrier apparatus of claim 1, further comprising a sensor structured to determine whether the barrier portion is in the open or closed position.

5. The security barrier apparatus of claim 1, further comprising a dampening device configured to slow a transition between the open and closed positions.

6. The security barrier apparatus of claim 1, further comprising one or more actuators in communication with the control module and configured to aid in moving the barrier portion between the open and closed positions.

7. The security barrier apparatus of claim 1, wherein the extension support is configured to couple to an extension support of another security barrier apparatus.

8. A security barrier apparatus comprising:
- an attachment portion configured to couple the security barrier apparatus to a display fixture;
- a support portion that couples to the attachment portion;
- a barrier portion pivotally coupled to the support portion, the barrier portion comprises,
  - a barrier frame surrounding a barrier element, and
  - a handle coupled to one of the barrier frame and the barrier element;
- an input device coupled to the support portion;
- a control module coupled to one of the support portion and the attachment portion; and
- a locking assembly in communication with the input device and structured to define an unlocked state and a locked state,
- wherein the control module is structured to be in electrical communication with the input device and the locking assembly and signal the locking assembly to move to the unlocked state when an input is provided to the input device and further structured to signal the locking assembly to move to the locked state when the input ceases to be provided to the input device, and
- wherein in the unlocked state, the barrier portion is enabled to be pivoted relative to the support portion between an open and closed position, and wherein in the locked state, the barrier portion is inhibited from pivoting relative to the support portion.

9. The security barrier apparatus of claim 8, wherein the attachment portion comprises two extension members extending from a first end to a second end.

10. The security barrier apparatus of claim 9, wherein each of the two extension members comprise,
- a first attachment member comprising a first interface with a plurality of adjusters, and
- a second attachment member comprising a second interface configured to engage the first attachment member at the first interface,
- wherein the first and second interfaces are configured for incremental adjustment to move the first attachment member and the second attachment member relative to each other.

11. The security barrier apparatus of claim 10, wherein the support portion comprises an extension support that is structured to couple to the first end of each of the two extension members.

12. The security barrier apparatus of claim 8, wherein the input device comprises a push button.

13. The security barrier apparatus of claim 8, further comprising a sensor structured to determine whether the barrier portion is in the open or closed position.

14. The security barrier apparatus of claim 8, further comprising a dampening device configured to slow a transition between the open and closed positions.

15. The security barrier apparatus of claim 8, further comprising one or more actuators in communication with the control module and configured to aid in moving the barrier portion between the open and closed positions.

16. The security barrier apparatus of claim 11, wherein the extension support is configured to couple to an extension support of another security barrier apparatus.

17. A security barrier system comprising:
 a plurality of security barrier apparatuses, wherein each security barrier apparatus comprises,
  an attachment portion configured to couple the security barrier apparatus to a display fixture,
  a support portion that couples to the attachment portion,
  a barrier portion pivotally coupled to the support portion, an input device coupled to the support portion,
  a control module coupled to one of the support portion and the attachment portion, and
  a locking assembly in communication with the input device and structured to define an unlocked state and a locked state; and
 a controller in communication with the control module and structured to transmit instructions to each control module.

18. The security barrier system of claim 17, wherein the controller is configured to transmit a lockdown signal to each of the plurality of security barrier apparatuses to inhibit movement of the barrier portion relative to the support portion.

19. The security barrier system of claim 17, further comprising an alarm configured to provide at least one of an (i) audio output and (ii) a visual output when the barrier portion is moved relative to the support portion.

20. The security barrier system of claim 17, further comprising a visual indicator configured to indicate a status of one or more of the barrier apparatuses.

* * * * *